United States Patent
Misawa et al.

(10) Patent No.: US 7,614,017 B2
(45) Date of Patent: Nov. 3, 2009

(54) INFORMATION PROCESSING APPARATUS, PROCESSING METHOD THEREFOR, PROGRAM ALLOWING COMPUTER TO EXECUTE THE METHOD

(75) Inventors: Junichirou Misawa, Tokyo (JP); Masahiro Kobori, Tokyo (JP); Shinichi Yamada, Chiba (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 11/458,558

(22) Filed: Jul. 19, 2006

(65) Prior Publication Data

US 2007/0021129 A1  Jan. 25, 2007

(30) Foreign Application Priority Data

Jul. 21, 2005  (JP)  ............................ P2005-211340

(51) Int. Cl.
*G06F 3/00* (2006.01)
*G06F 3/048* (2006.01)
*G06F 3/14* (2006.01)
*H04M 3/00* (2006.01)
*H04W 4/00* (2009.01)
*H04W 74/00* (2009.01)

(52) U.S. Cl. .................. 715/856; 715/716; 715/718; 715/722; 715/738; 715/815; 715/819; 715/820; 715/832; 715/864; 715/860; 455/419; 455/435.2; 455/455; 455/450; 455/464

(58) Field of Classification Search .................. 715/716, 715/718, 722, 738, 815, 819–820, 832, 864, 715/856, 860; 455/419, 435.2, 455, 450, 455/464

See application file for complete search history.

(56) References Cited

U.S. PATENT DOCUMENTS

| 5,237,653 | A | * | 8/1993 | Noguchi et al. ............. 715/797 |
| 6,389,434 | B1 | * | 5/2002 | Rivette et al. ............... 715/209 |
| 6,886,138 | B2 | * | 4/2005 | Laffey et al. ................ 715/860 |
| 7,086,013 | B2 | * | 8/2006 | Saund et al. ................ 715/863 |
| 7,305,242 | B2 | * | 12/2007 | Zakharia et al. .......... 455/456.1 |

(Continued)

FOREIGN PATENT DOCUMENTS

JP  2005-115529  4/2005

OTHER PUBLICATIONS

Microsoft Windows XP Professional; Microsoft Corporation, version 2002.*

*Primary Examiner*—Dennis-Doon Chow
*Assistant Examiner*—Linh K Pham
(74) *Attorney, Agent, or Firm*—K&L Gates LLP

(57) ABSTRACT

An information processing apparatus is provided and includes a receiving section for receiving content data, a selection area movement instructing section for receiving an operation signal to instruct movement of a selection area and giving an instruction corresponding to the operation signal, a selection area displaying section for moving the selection area according to the instruction given by the selection area movement instructing means, a link display position information extracting section for extracting display position information of a link display from the content data, a link selection instructing section for receiving an operation signal to instruct a selection of a predetermined link and giving an instruction corresponding to the operation signal, a link selection controlling section for selecting the link instructed by the link selection instructing means, and a sending the link destination section for sending a request for replying content data.

16 Claims, 16 Drawing Sheets

U.S. PATENT DOCUMENTS

| | | | |
|---|---|---|---|
| 7,383,515 B2* | 6/2008 | Bardon et al. | 715/823 |
| 2002/0069223 A1* | 6/2002 | Goodisman et al. | 707/513 |
| 2002/0083093 A1* | 6/2002 | Goodisman et al. | 707/511 |
| 2003/0115607 A1* | 6/2003 | Morioka et al. | 725/61 |
| 2003/0234804 A1* | 12/2003 | Parker et al. | 345/719 |
| 2004/0135819 A1* | 7/2004 | Maa | 345/840 |
| 2004/0148636 A1* | 7/2004 | Weinstein et al. | 725/113 |
| 2004/0239681 A1* | 12/2004 | Robotham et al. | 345/581 |
| 2005/0180728 A1* | 8/2005 | Ichioka et al. | 386/46 |
| 2005/0229213 A1* | 10/2005 | Ellis et al. | 725/58 |
| 2006/0085829 A1* | 4/2006 | Dhodapkar et al. | 725/105 |
| 2007/0021129 A1* | 1/2007 | Misawa et al. | 455/457 |
| 2007/0266406 A1* | 11/2007 | Aravamudan et al. | 725/57 |
| 2008/0138033 A1* | 6/2008 | Rodriguez et al. | 386/92 |

* cited by examiner

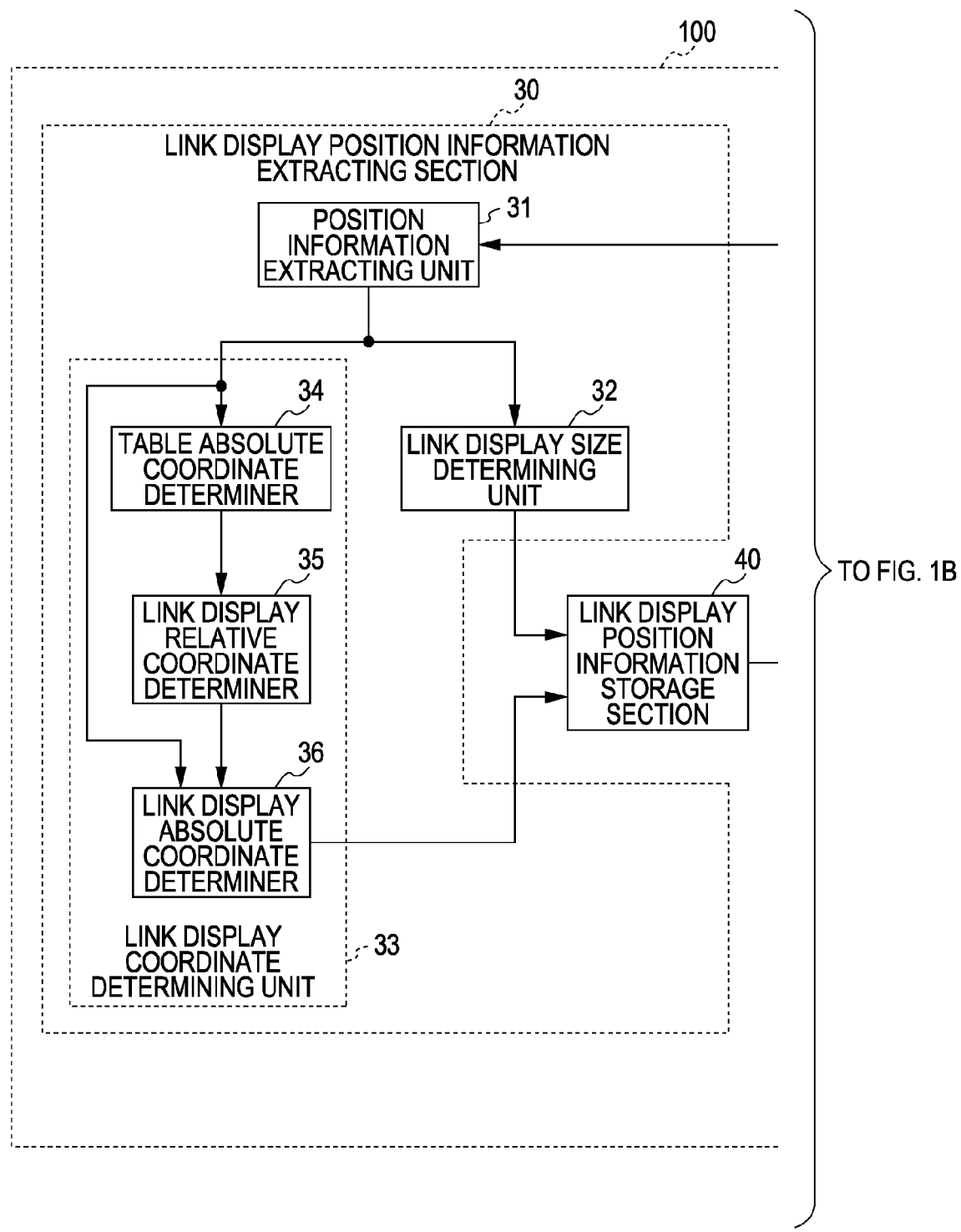

FIG. 3

| LINK NAME | ABSOLUTE COORDINATES | HEIGHT | WIDTH |
|---|---|---|---|
| NEWS | (X1, Y1) | H1 | W1 |
| SHOPPING | (X2, Y2) | H2 | W2 |
| TRAVEL | (X3, Y3) | H3 | W3 |
| ⋮ | ⋮ | ⋮ | ⋮ |

INFORMATION PROCESSING APPARATUS, PROCESSING METHOD THEREFOR, PROGRAM ALLOWING COMPUTER TO EXECUTE THE METHOD

CROSS REFERENCES TO RELATED APPLICATIONS

The present invention contains subject matter related to Japanese Patent Application JP 2005-211340 filed in the Japanese Patent Office on Jul. 21, 2005, the entire contents of which are incorporated herein by reference.

BACKGROUND

The present invention generally relates to information processing apparatuses having a Web (i.e., World Wide Web) browsing function. More particularly, the present invention relates to an information processing apparatus enabling an easier selection operation of a link displayed on a Web browser, a processing method therefor, and a program allowing a computer to execute the method.

With the recent development of communication technology, the Internet has become widely used even in homes. Personal computers (hereinafter, referred to as "PCs") have been used to access the Internet. In response to the widespread utilization of the Internet, home appliances that can be used to access the Internet instead of PCs have been developed. A technique enabling the utilization of the Internet with televisions, among these home appliances, having a Web browsing function has been suggested (see, for example, Japanese Unexamined Patent Application Publication No. 2002-99184, FIG. 1).

In this technique, a user selects a target link displayed on a Web browser by placing a cursor displayed on a TV screen using arrow buttons provided on a remote control employing infrared communication.

In the above-mentioned known technique, a user uses arrow buttons provided on a remote control to move a cursor when selecting a link. If the cursor is configured to move fast, it becomes difficult for the user to place the cursor over the target link. In contrast, if the cursor is configured to move slowly, the user may feel frustrated, for example, when moving the cursor from one side to another on the screen. In addition, the appropriate speed of the cursor movement varies depending on each user. Thus, it takes a long time to use the above-mentioned known technique.

The disadvantage of the above-mentioned known technique may be overcome by using an analog remote control device that enables unrestricted operations similar to those performed with a mouse. However, the amount of information sent from the analog remote control device enabling the unrestricted operations is significant. Due to its low transfer rate, the infrared communication system has to be replaced by another wireless communication system. The use of a wireless communication system other than the infrared communication system increases cost and power consumption.

SUMMARY

The present invention in an embodiment provides an information processing apparatus that enables an easier selection operation of a link displayed on a Web browser.

To this end, according to an embodiment of the present invention, there is provided an information processing apparatus including receiving means for receiving content data from a Web server, selection area movement instructing means for receiving a first operation signal to instruct movement of a predetermined selection area displayed in an area where the content data is displayed, and for giving an instruction corresponding to the first operation signal, selection area displaying means for moving and displaying the selection area according to the instruction given by the selection area movement instructing means, link display position information extracting means for analyzing the content data, and for extracting, from the content data, display position information of a display for a link, namely, a link display, included in the content data, link selection instructing means for receiving a second operation signal to instruct a selection of a predetermined link included in the content data, and for giving an instruction corresponding to the second operation signal, link selection controlling means for selecting the predetermined link instructed by the link selection instructing means when the link display corresponding to the predetermined link to be selected is located within the selection area, and sending means for sending, to a link destination of the link selected by the link selection controlling means, a request for replying content data that the link destination stores. This advantageously allows a user to easily select a link displayed on a Web browser.

The selection area displaying means in an embodiment may display the selection area such that the brightness of the selection area and that of an area surrounding the selection area differ. This advantageously allows a user to easily recognize the position of the selection area.

The selection area displaying means in an embodiment may display the circular selection area. This advantageously allows a user to easily recognize the position of the selection area and to easily select a link displayed on a Web browser.

The selection area displaying means in an embodiment may split the area where the content data is displayed into a predetermined number of areas, display the selection area in one of the split areas, and move the selection area on a split area basis according to the instruction given by the selection area movement instructing means. This advantageously allows a user to easily recognize the position of the selection area and to easily select a link displayed on a Web browser having many link displays thereon.

The selection area displaying means in an embodiment may further split the split area into a predetermined number of sub-areas, display the selection area in one of the sub-areas, and move the selection area on a sub-area basis according to the instruction given by the selection area movement instructing means. This advantageously allows a user to easily recognize the position of the selection area and to easily select a link displayed on a Web browser having many link displays thereon.

The selection area displaying means in an embodiment may have circular selection area displaying means for moving and displaying the circular selection area according to the instruction given by the selection area movement instructing means, and split selection area displaying means for splitting the area where the content data is displayed into a predetermined number of areas, for displaying the selection area in one of the split areas, and for moving the selection area on a split area basis according to the instruction given by the selection area movement instructing means. The information processing apparatus may further include display selecting means for receiving a third operation signal to instruct a selection of either the circular selection area displaying means or the split selection area displaying means, and for making the selection according to the third operation signal. This advantageously allows a user to easily recognize the position of the selection area in a suitable manner selectable by the user and to easily select a link displayed on a Web browser having many link displays thereon.

The selection area displaying means in an embodiment may change the size of the selection area according to the display size of the content data. Accordingly, the selection area is advantageously displayed according to the user's preference.

The selection area displaying means in an embodiment may display an icon associated with the selection area. This advantageously allows a user to naturally recognize the selection area.

The link display position information extracting means in an embodiment may have position information extracting means for extracting, from the content data, the position information that defines the display position of the link display, link display size determining means for determining the height and width of the link display on the basis of the position information, and link display coordinate determining means for determining the absolute coordinates of the link display in the area where the content data is displayed on the basis of the position information. Accordingly, the position of the link display in the area where the content data is displayed is advantageously extracted.

The content data in an embodiment may include data written in Hyper Text Markup Language. Accordingly, the position of the link display in the area where the content data is displayed is advantageously extracted using the known techniques easily.

The link display coordinate determining means in an embodiment may have table coordinate determining means for determining the absolute coordinates of a table in the area where the content data is displayed on the basis of the position information of the table extracted from the data written in Hyper Text Markup Language included in the content data, link display relative coordinate determining means for determining the relative coordinates of the link display relative to the table on the basis of the position information of the link extracted from the data written in Hyper Text Markup Language included in the content data, and link display absolute coordinate determining means for determining the absolute coordinates of the link display in the area where the content data is displayed on the basis of the relative coordinates of the link display and the absolute coordinates of the table. Accordingly, the position of the link display located within the table in the area where the content data is displayed is advantageously extracted.

Regarding the link displays not located within the table, the link display absolute coordinate determining means in an embodiment may determine the absolute coordinates of the link display in the area where the content data is displayed on the basis of the position information of the link extracted from the data written in Hyper Text Markup Language included in the content data. Accordingly, the position of the link display not located within the table in the area where the content data is displayed is advantageously extracted.

The link selection controlling means in an embodiment may give an instruction to display the link display located within the selection area with an indication to show the link display is located within the selection area. This advantageously allows a user to easily recognize the link displays located within the selection area.

The operation signals in an embodiment may correspond to operation signals used in infrared communication. This advantageously reduces the necessary cost.

According to another embodiment of the present invention, there is provided an information processing system including an information processing apparatus and an operation terminal. The information processing apparatus has receiving means for receiving content data from a Web server, selection area movement instructing means for receiving a first operation signal to instruct movement of a predetermined selection area displayed in an area where the content data is displayed, and for giving an instruction corresponding to the first operation signal, selection area displaying means for moving and displaying the selection area according to the instruction given by the selection area movement instructing means, link display position information extracting means for analyzing the content data, and for extracting, from the content data, display position information of a display for a link, namely, a link display, included in the content data, link selection instructing means for receiving a second operation signal to instruct a selection of a predetermined link included in the content data, and for giving an instruction corresponding to the second operation signal, link selection controlling means for selecting the predetermined link instructed by the link selection instructing means when the link display corresponding to the predetermined link to be selected is located within the selection area, and sending means for sending, to a link destination of the predetermined link selected by the link selection controlling means, a request for replying content data that the link destination stores. The operation terminal sends the first operation signal to instruct the movement of the selection area and the second operation signal to instruct the selection of the predetermined link included in the content data. This advantageously allows a user to easily select a link displayed on a Web browser.

According to still another embodiment of the present invention, there is provided a processing method or a program allowing an information processing apparatus, which selects a link displayed in an area where content data received from a Web server is displayed according to operation signals sent from an operation terminal, and sends, to a link destination of the selected link, a request for replying predetermined content data, to execute a process. The method or process includes a link display position information extracting step of analyzing the content data, and of extracting, from the content data, display position information of a display for a link, namely, a link display, included in the content data, a selection area movement instructing step of receiving the operation signal to instruct movement of a predetermined selection area displayed in the area where the content data is displayed, and of giving an instruction corresponding to the operation signal, a selection area displaying step of moving and displaying the selection area according to the instruction given in the selection area movement instructing step, a link selection instructing step of receiving the operation signal to instruct a selection of a predetermined link displayed in the area where the content data is displayed, and of giving an instruction corresponding to the operation signal, a link selecting step of selecting the predetermined link instructed in the link selection instructing step when the link display corresponding to the predetermined link to be selected is located within the selection area, and sending step of sending, to the link destination of the selected predetermined link, a request for replying predetermined content data. This advantageously allows a user to easily select a link displayed on a Web browser.

The embodiments of the present invention advantageously provide an easier selection operation of a link displayed on a Web browser.

Additional features and advantages are described herein, and will be apparent from, the following Detailed Description and the figures.

BRIEF DESCRIPTION OF THE FIGURES

FIG. 3 shows an example of content stored in a link display position information storage section described in FIG. 1.

DETAILED DESCRIPTION

A description in detail with reference to the accompanying drawings is provided below according to an embodiment.

Figure 1B:
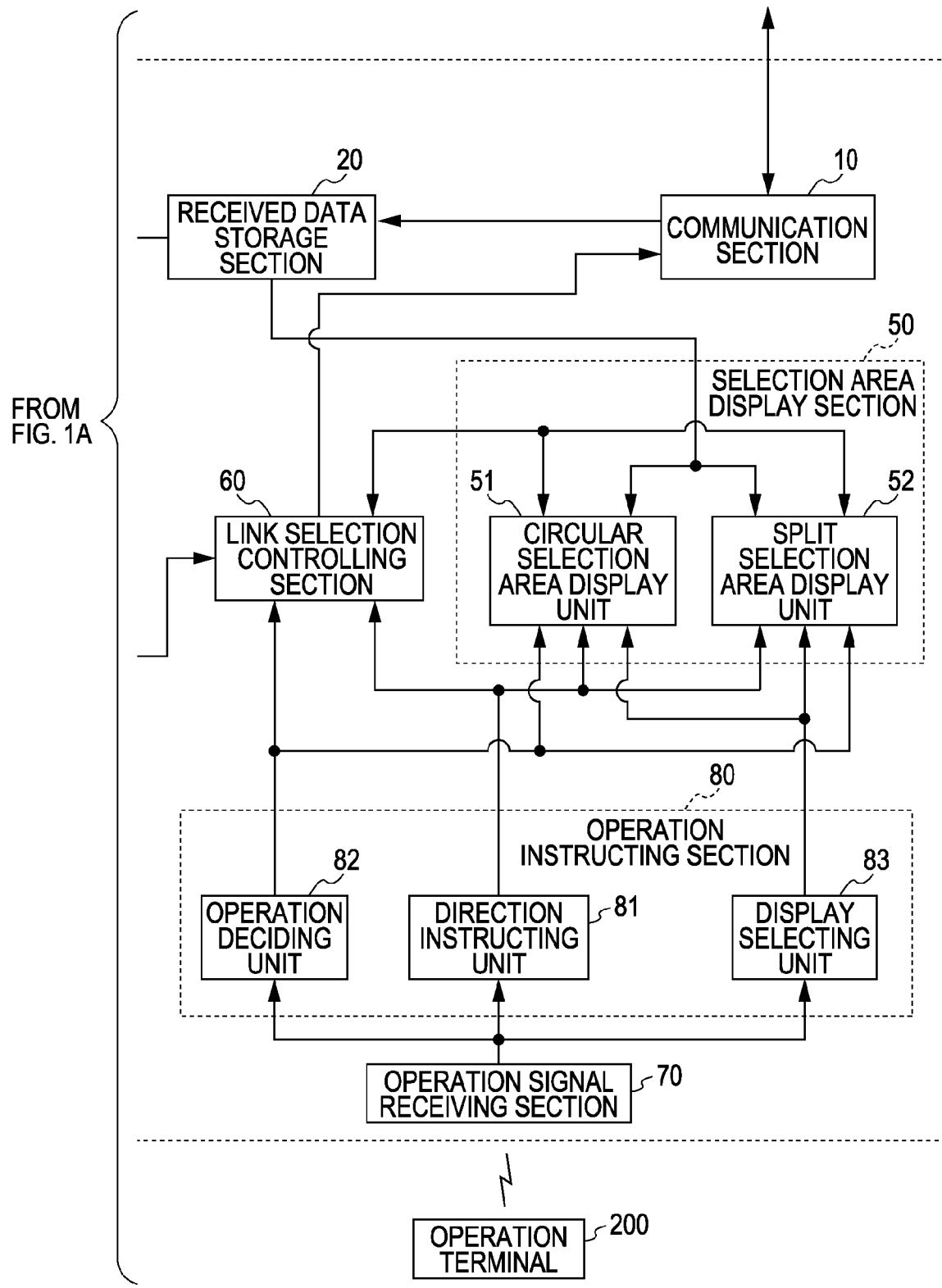
FIG. 1 shows an example of a function configuration of an information processing apparatus according to a first embodiment of the present invention.

FIG. 1 shows an example of a function configuration of an information processing apparatus 100 according to a first embodiment of the present invention. The information processing apparatus 100 according to the first embodiment includes a communication section 10, a received data storage section 20, a link display position information extracting section 30, a link display position information storage section 40, a selection area display section 50, a link selection controlling section 60, an operation signal receiving section 70, and an operation instructing section 80.

The communication section 10 receives electric signals via a network, and converts the electric signals into data handlable by the information processing apparatus 100. The communication section 10 also converts the data into electric signals, and sends the electric signals via the network. The first embodiment of the present invention assumes that the data to be received via the network is content data supplied from a Web server (not shown). This content data may be written in, but not limited to, HTML (Hyper Text Markup Language). Additionally, the data to be sent includes, for example, a request for replying content data that is sent to a destination of a link included in the content data. The received data storage section 20 stores the content data received by the communication section 10.

The link display position information extracting section 30 extracts information regarding the display position of a display for the link (hereinafter, referred to as "link display") included in the content data. More specifically, the link display position information extracting section 30 extracts the display position of the link display in an area, on a Web browser, where the content data is displayed. Meanwhile, the Web browser is software having a function for browsing content data or the like. More specifically, the Web browser reconstructs a layout according to HTML tags, displays characters and images, and plays movies and audio.

The link display position information extracting section 30 has a position information extracting unit 31, a link display size determining unit 32, and a link display coordinate determining unit 33. The position information extracting unit 31 extracts the link information from the content data stored in the received data storage section 20.

For example, in the content data written in HTML, a tag <A HREF="URL (Uniform Resource Locator) address"> (character or image representing a link) </A> represents a link. The link display position information extracting section 30 extracts this link information. In addition, in the content data written in HTML, a link may be included in a table. In this case, the position of the link display is indicated relative to a position of the table. A tag <TABLE>~</TABLE> represents a table. On the basis of this tag, the display position of the table in an area where the content data is displayed (hereinafter, referred to as "content data display area") can be obtained. The link display position information extracting section 30 also extracts this table information.

The link display size determining unit 32 determines the height and width of the link display on the basis of the link information extracted by the link display position information extracting section 30. Suppose a link display "PATENT" is displayed. The height and width of a rectangle circumscribing this link display is used as the height and width of the link display.

The link display coordinate determining unit 33 determines coordinates of the link display in the content data display area on the basis of the information extracted by the link display position information extracting section 30. The content data display area indicates, for example, the area where the content data is displayed on the Web browser. In the first embodiment, absolute coordinates and relative coordinates are used. The origin and the coordinate axes in the content data display area specify the absolute coordinates. The origin and the coordinate axes in an area where the table included in the content data is displayed (hereinafter, referred to as "table display area") specify the relative coordinates. The link display coordinate determining unit 33 will be further described below.

The link display coordinate determining unit 33 has a table absolute coordinate determiner 34, a link display relative coordinate determiner 35, and a link display absolute coordinate determiner 36. The table absolute coordinate determiner 34 determines the absolute coordinates of a predetermined point of the table in the content data display area on the basis of the table information extracted by the link display position information extracting section 30. The link display relative coordinate determiner 35 determines the relative coordinates of a predetermined point of the link display in the table display area on the basis of the link information extracted by the link display position information extracting section 30.

The link display absolute coordinate determiner 36 determines the absolute coordinates of a predetermined point of the link display in the content data display area on the basis of the relative coordinates determined by the link display relative coordinate determiner 35 and the absolute coordinates of the table. More specifically, when the link display is located within the table display area, the absolute coordinates of the table in the content data display area are determined first. Then, the relative coordinates of the link display in the table display area are determined. On the basis of the relative coordinates of the link display and the absolute coordinates of the table in the content data display area, the absolute coordinates of the link display in the content data display area are determined.

Additionally, when the link display is not located within the table display area, the link display absolute coordinate determiner 36 directly determines the absolute coordinates of a predetermined point of the link display on the basis of the link information extracted by the link display position information extracting section 30.

The link display position information storage section 40 stores the height and width of the link display determined by the link display size determining unit 32 and the absolute coordinates of the predetermined point of the link display determined by the link display absolute coordinate determiner 36.

The selection area display section 50 displays the content data and a selection area. Herein, the selection area means an area having a predetermined size in the content data display area. The selection area display section 50 moves the selection area in accordance with instructions given by a direction instructing unit 81 described below. The selection area display section 50 also removes the selection area in accordance with instructions given by an operation deciding unit 82 described below.

In the first embodiment of the present invention, the selection area may be displayed with brightness different from the surrounding area. More specifically, the selection area is displayed brighter than the surrounding area. This allows users to recognize the selection area more easily.

Furthermore, in the first embodiment of the present invention, the shape of the selection area is, but not limited to, a circle or an ellipse. The shape of the selection area may be a rectangle or a polygon. In addition, the selection area may be configured to move vertically and horizontally on a pixel-by-pixel basis. Alternatively, the content data display area may be split into a predetermined number of areas, and the selection area may be configured to move on a split area basis. In addition, the split area may be further split into sub-areas, and the selection area may be configured to move on a sub-area basis.

Referring back to FIG. 1, the selection area display section 50 has a circular selection area display unit 51 and a split selection area display unit 52. The circular selection area display unit 51 displays a circular selection area, and moves the selection area vertically and horizontally on a pixel-by-pixel basis. The split selection area display unit 52 displays a rectangular selection area. The split selection area display unit 52 splits the content data display area into a predetermined number of split areas, and moves the selection area on a split area basis. As described above, the split area may be further split into sub-areas, and the selection area may be configured to move on a sub-area basis.

The link selection controlling section 60 controls the selection of the link displays located within the selection area on the basis of the position information of the link display stored in the link display position information storage section 40. More specifically, the link selection controlling section 60 permits the selection of the link display only when the link display is located within the selection area displayed by the selection area display section 50.

The link selection controlling section 60 also instructs the selection area display section 50 to display the link displays located within the selection area with indications to show the link displays are located within the selection area. In response to this instruction, the selection area display section 50 displays the link displays located within the selection area with the indications to show the link displays are located within the selection area. For example, the link displays located within the selection area may be displayed, but not limited to, in a color different from the others, or with a frame around each link display.

The operation signal receiving section 70 receives operation signals sent from the operation terminal 200, and supplies signals corresponding to the operation signals to the operation instructing section 80. In the embodiment of the present invention, the information processing apparatus 100 and the operation terminal 200 employ, for example, an infrared communication system. However, the communication system is not limited to this particular communication system, and other wireless communication systems and wired communication systems may be employed.

The operation instructing section 80 instructs the selection area display section 50 and the link selection controlling section 60 to perform operations according to the operation signals sent from the operation terminal 200. More specifically, the operation instructing section 80 has a direction instructing unit 81, an operation deciding unit 82, and a display selecting unit 83.

The direction instructing unit 81 gives the selection area display section 50 instructions regarding the moving direction of the selection area. The direction instructing unit 81 also gives the link selection controlling section 60 instructions regarding the movement of the color display or frame display attached to the link displays. In response to these instructions, the link selection controlling section 60 causes the selection area display section 50 to perform the color display or the frame display as it is instructed.

The operation deciding unit 82 decides the position of the selection area, and instructs the selection area display section 50 to remove the selection area. The operation deciding unit 82 also informs the link selection controlling section 60 of the selected link displays to be displayed in a different color or with a frame.

The display selecting unit 83 selects either the circular selection area display unit 51 or the split selection area display unit 52 on the basis of the signals corresponding to the operation signals supplied from the operation signal receiving section 70.

Figure 2A:
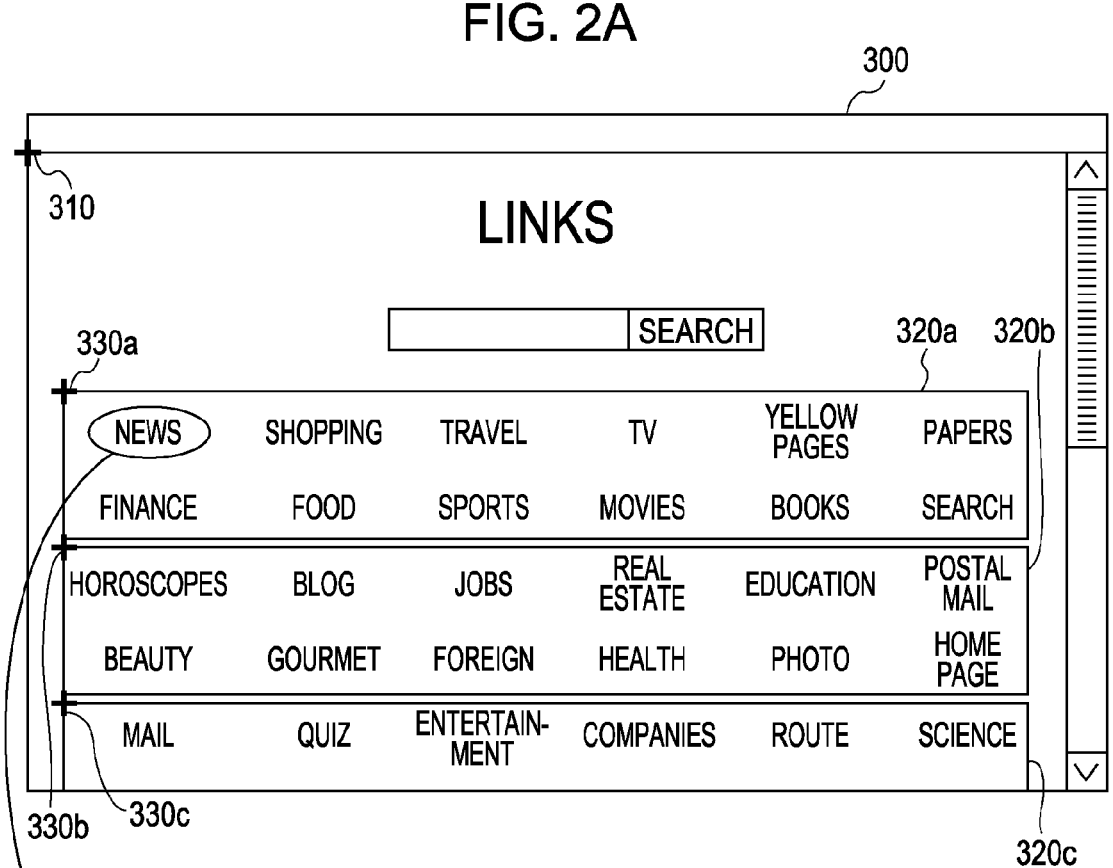
FIG. 2A shows an example of content data displayed on a display screen of an information processing apparatus according to a first embodiment of the present invention.

FIG. 2A shows an example of content data displayed on a display screen 300 of the information processing apparatus 100 according to the first embodiment of the present invention. The display screen 300 displays a Web browser that has downloaded the content data having a title "LINKS". Referring to FIG. 2A, a point 310 at the top left corner of the content data display area on the Web browser corresponds to the origin of the content data display area described in FIG. 1. In addition, the vertical and horizontal directions of the display screen 300 correspond to the coordinate axes. That is, the absolute coordinates described in FIG. 1 are represented in a 2-dimensional space defined by the origin at the point 310 and the coordinate axes in the vertical and horizontal directions of the display screen 300.

Furthermore, tables 320a to 320c correspond to the tables described in FIG. 1. Points 330a to 330c located at the top left corner of the tables 320a to 320c, respectively, correspond to the origin of the table display areas described in FIG. 1. In addition, the vertical and horizontal directions of each table correspond to the coordinate axes. That is, the relative coordinates described in FIG. 1 are represented in a 2-dimensional space defined by the origins at the points 330a to 330c and the coordinate axes in the vertical and horizontal directions of the tables 320a to 320c, respectively.

Figure 2B:
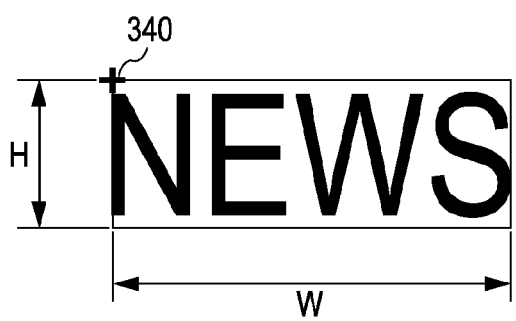
FIG. 2B shows height and width of a link display.

FIG. 2B shows the height and width of the link display. Herein, an explanation is given taking a link display "NEWS" included in the content data as an example. A point 340 at the top left corner of a rectangle circumscribing the link display "NEWS" is a reference point of the coordinates of the link display. More specifically, the absolute coordinates and the relative coordinates are determined regarding the point 340. The reference point of the coordinates may be any point. In addition, for example, the height H and width W of the rectangle circumscribing the link display "NEWS" is used as the height and width of the link display "NEWS".

FIG. 3 shows an example of the content stored in the link display position information storage section 40 described in FIG. 1. The link display position information storage section 40 stores information regarding a link name 41, absolute coordinates 42, height 43, and width 44.

The link name 41 indicates the name of the link display such as "NEWS". When the link display is an image, the name of the image file, for example, is used as the link name 41. The absolute coordinates 42 indicate the absolute coordinates of a predetermined point of the link display in the content data display area. The content data display area means, for example, the display area of the content data on the Web browser as shown in FIG. 2A. The height 43 indicates the height of the link display, and corresponds to, for example, the height H of the rectangle circumscribing the link display as shown in FIG. 2B. The width 44 indicates the width of the link display, and corresponds to, for example, the width W of the rectangle circumscribing the link display as shown in FIG. 2B.

This position information determines the position of the link display. More specifically, the absolute coordinates, height, and width of the link display specify the position of the link display.

Figure 4:
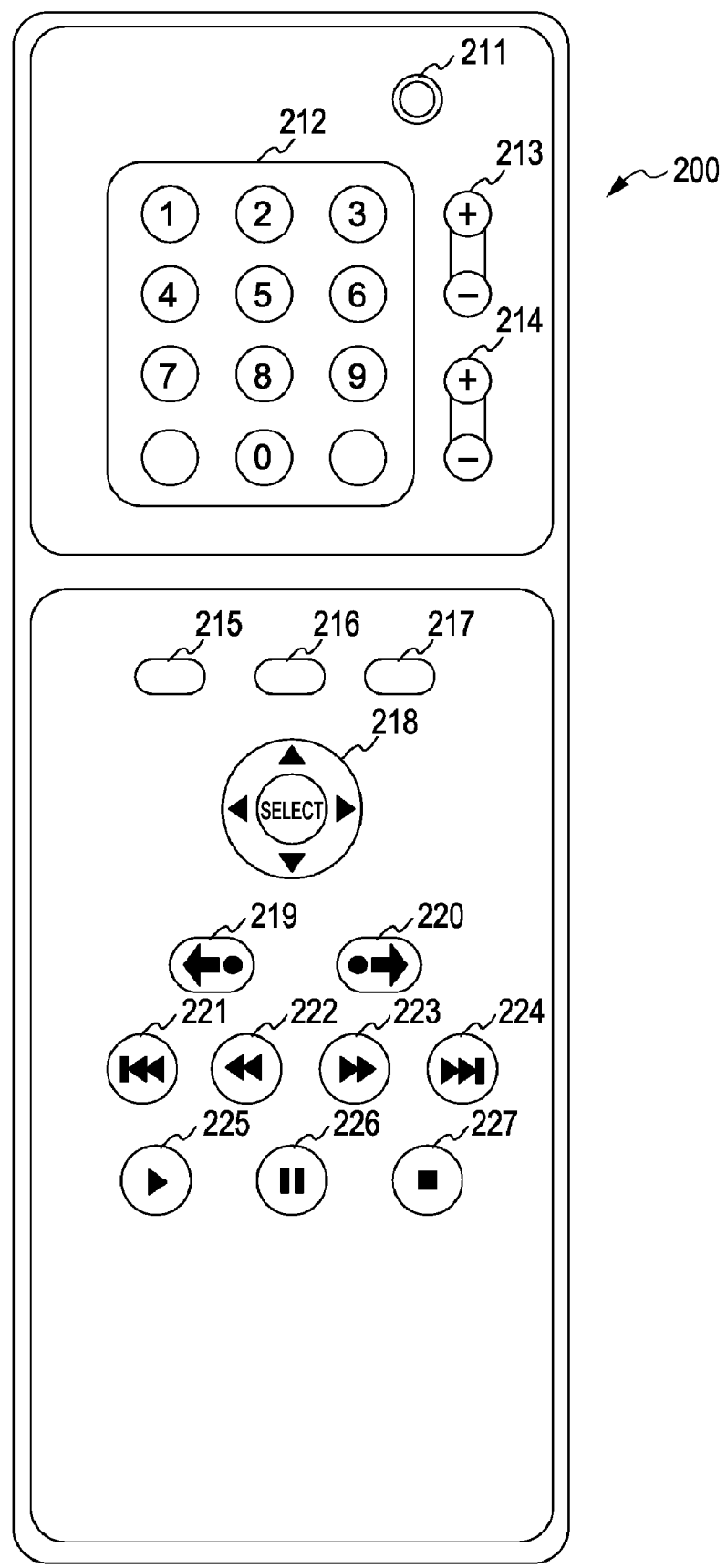
FIG. 4 shows an operation terminal according to a first embodiment of the present invention.

FIG. 4 shows the operation terminal 200 according to the first embodiment of the present invention. As shown in FIG. 4, the operation terminal 200 has a power button 211 operated to turn on/off a target apparatus, a numeric keypad 212 operated to select a channel, channel up/down buttons 213 operated to sequentially select a channel, and volume up/down buttons 214 operated to adjust the volume level.

Furthermore, the operation terminal 200 has a system menu button 215 operated to display a system menu, a title list button 216 operated to display a title list, a tool button 217 operated to display a tool, an arrow-select buttons 218 operated to move a cursor to the left, to the right, upward, and downward and to set the selection, a reverse skip button 219 operated to skip images in a reverse direction, and a forward skip button 220 operated to skip images in a forward direction.

In the first embodiment of the present invention, the users use the arrow-select buttons 218 to move the selection area and to set the position of the selection area. Additionally, after setting the position of the selection area, the users use the arrow-select buttons 218 to move the color display or frame display to another link display and to select the link display.

Continuously pressing the reverse skip button 219 and the forward skip button 220 for a predetermined period causes the same actions caused by repeatedly pressing these buttons a plurality of times. Additionally, the operation terminal 200 has a previous button 221 operated to skip to the previous title, chapter, or track, a next button 224 operated to skip to the next title, chapter, or track, a fast reverse button 222 operated to perform fast reverse playback, a fast forward button 223 operated to perform fast forward playback, a playback button 225 operated to perform playback, a pause button 226 operated to pause playback, a stop button 227 operated to stop playback.

Figure 5:
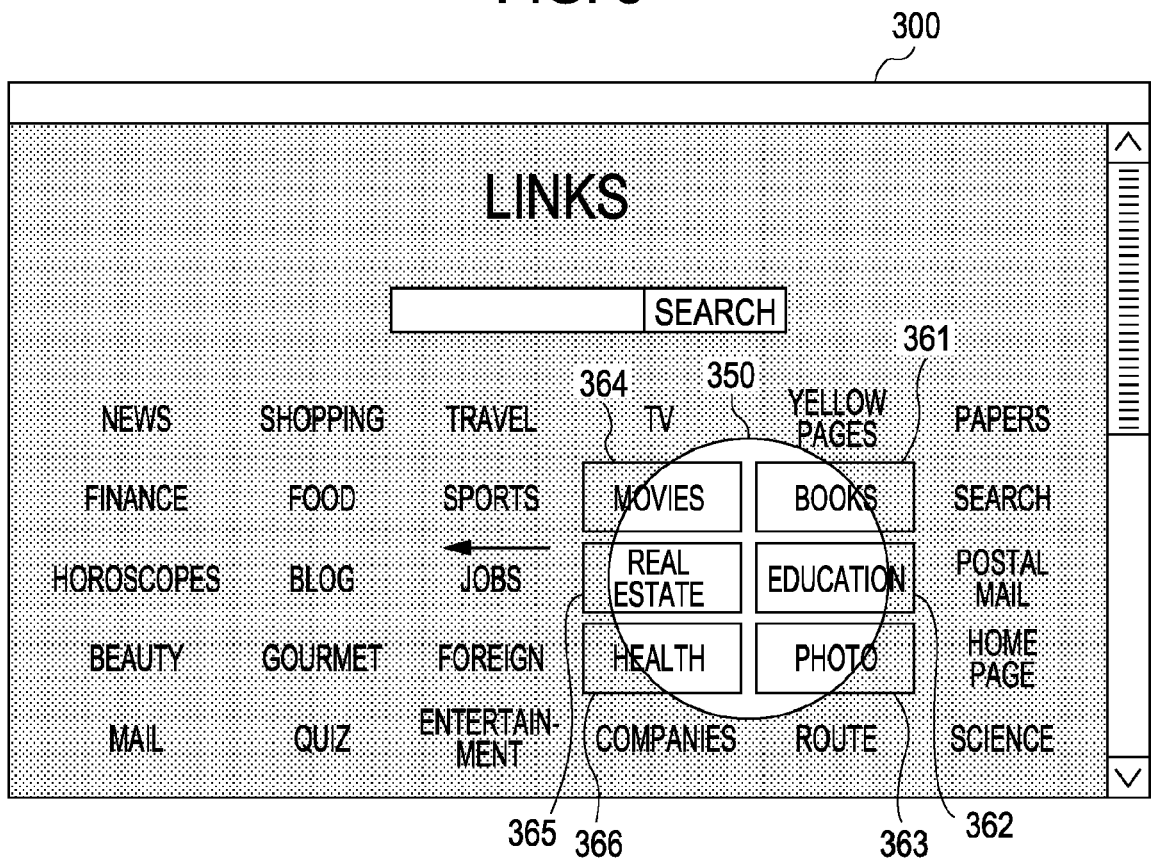
FIG. 5 shows an example display screen of an information processing apparatus according to a first embodiment of the present invention.
Figure 5:
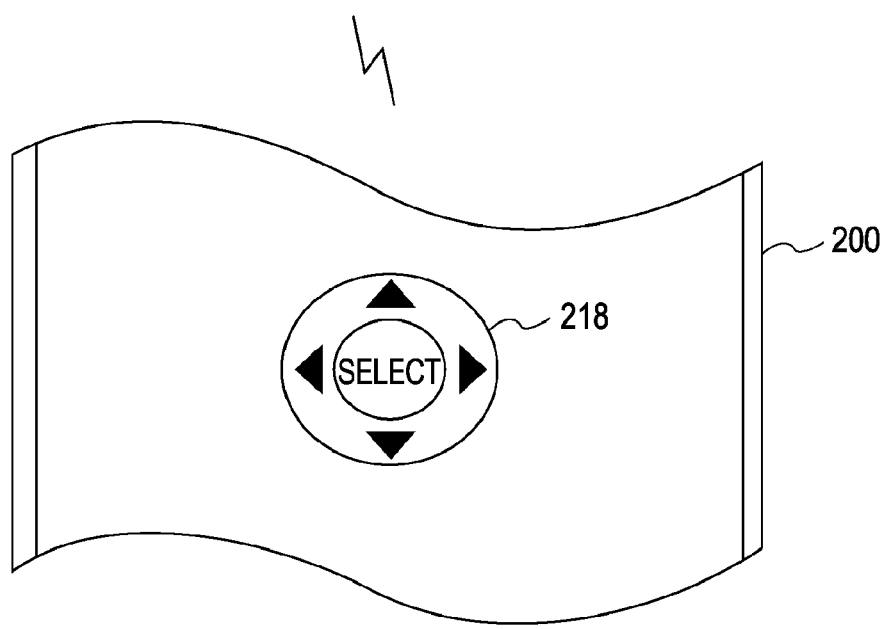

FIG. 5 shows an example display screen 300 of the information processing apparatus 100 according to the first embodiment of the present invention. The circular selection area display unit 51 described in FIG. 1 implements the screen displayed on the display screen 300 of the information processing apparatus 100 according to the first embodiment of the present invention. The display screen 300 displays a Web browser that has downloaded the content data having a title of "LINKS". A selection area 350 is displayed in the content data display area on the Web browser. The circular selection area 350 is displayed brighter than the surrounding area. This allows the users to recognize the position of the selection area 350 more easily.

The users can move the selection area 350 with the arrow-select buttons 218 of the operation terminal 200. In FIG. 5, although a left arrow is shown as an example, the moving direction is not limited to this particular direction, and the selection area 350 can be moved in any directions.

The link displays 361 to 366 are displayed with frames to indicate these link displays are located within the selection area 350. However, the manner of displaying these selected link displays is not limited to the frame display, and the above-described color display may be used. If the user moves the selection area 350 using the operation terminal 200, the frames attached to the link displays 361 to 366 are removed, and are attached to those newly included in the selection area 350. This allows the users to recognize the link displays included in the selection area more easily.

Figure 6A:
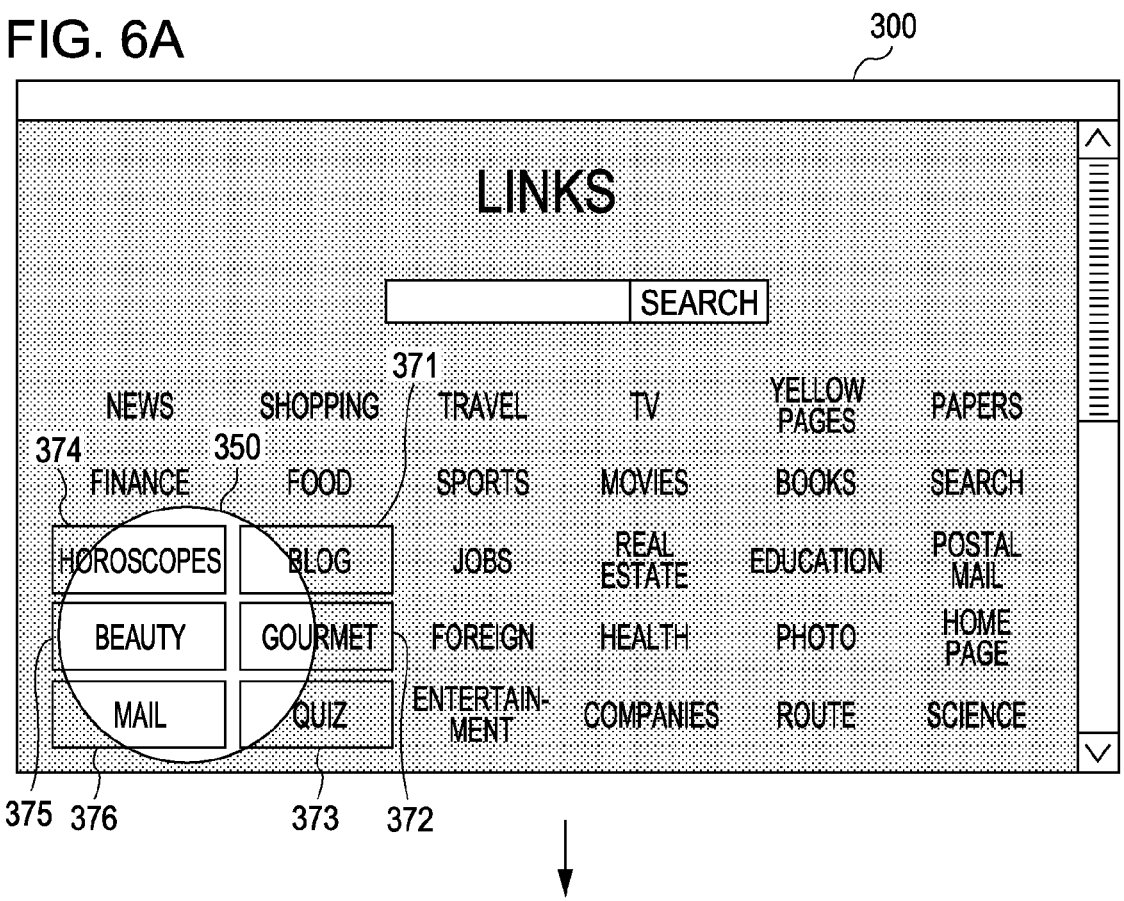
FIGS. 6A and 6B show a process of selecting a link display "MAIL" included in content data.

FIG. 6A shows a process of selecting a link display 376, i.e., "MAIL", included in the content data. The user first moves the selection area 350, originally located at the position shown in FIG. 5, to the left using the arrow-select buttons 218 of the operation terminal 200 so that the selection area 350 includes the link display 376, i.e., "MAIL", as shown in FIG. 6A. In FIG. 6A, the selection area 350 includes link displays 371 to 376, each of which is displayed with the frame.

Figure 6B:
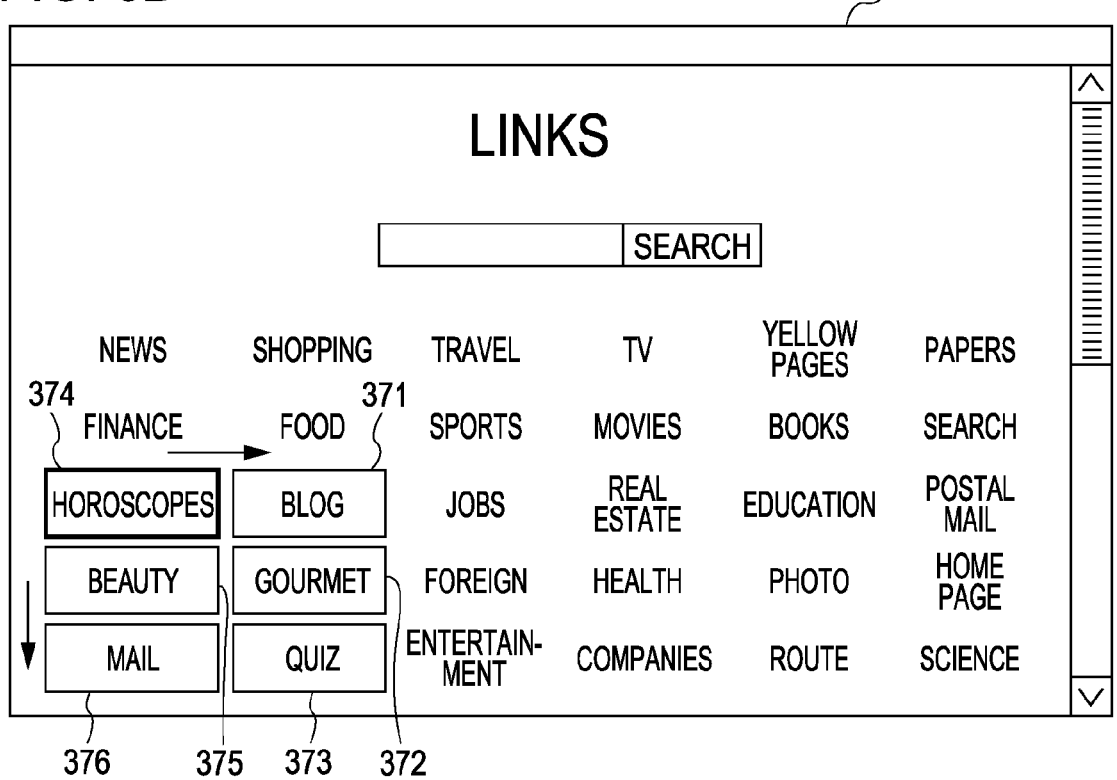

If the user presses the select button provided at the center of the arrow-select buttons 218 of the operation terminal 200 after placing the selection area 350 over the link display 376, i.e., "MAIL", the screen shown in FIG. 6B is displayed. More specifically, the selection area 350 is removed, so that the brightness of the selection area 350 and that of the surrounding areas become the same. Furthermore, one of the frames attached to the link displays 371 to 376 is thickened. Hereinafter, this frame display with the thicker border is referred to as "thick frame display". At this time, the link displays selectable with the arrow-select buttons 218 of the operation terminal 200 are limited to those displayed with frames.

The user can move the thick frame display using the arrow buttons of the arrow-select buttons 218 of the operation terminal 200. The user then moves the thick frame display to the link display 376, i.e., "MAIL", using the arrow buttons of the arrow-select buttons 218 of the operation terminal 200. At this time, by pressing the select button of the arrow-select buttons 218 of the operation terminal 200, the user can select the link display 376, i.e., "MAIL", currently displayed with the thick frame. This causes content data corresponding to the link display 376, i.e., "MAIL", to be displayed on the Web browser.

As described above, after selecting a plurality of link displays by the selection area, the user can select one of the link displays located within the selection area. Thus, an easier selection operation of a link display in the content data display area having many link displays is provided.

Figure 7:
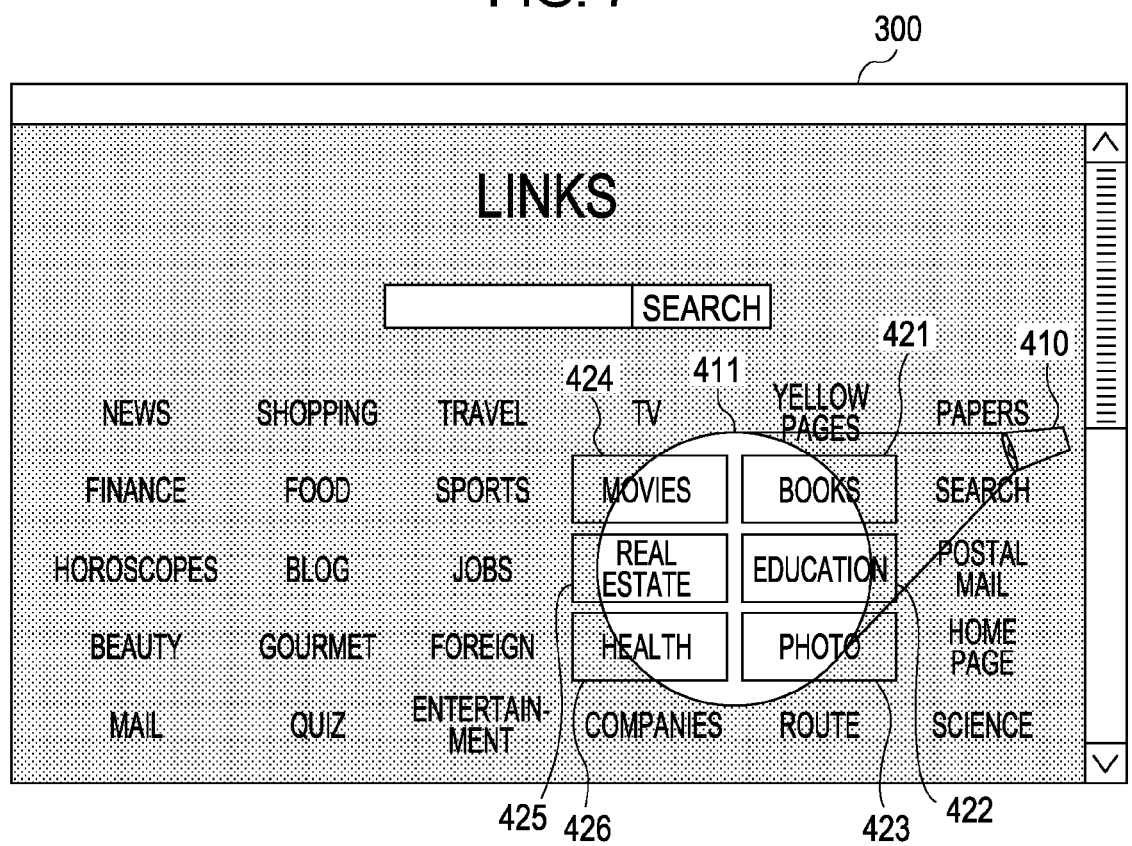
FIG. 7 shows a display screen according to a second embodiment of the present invention.
Figure 7:
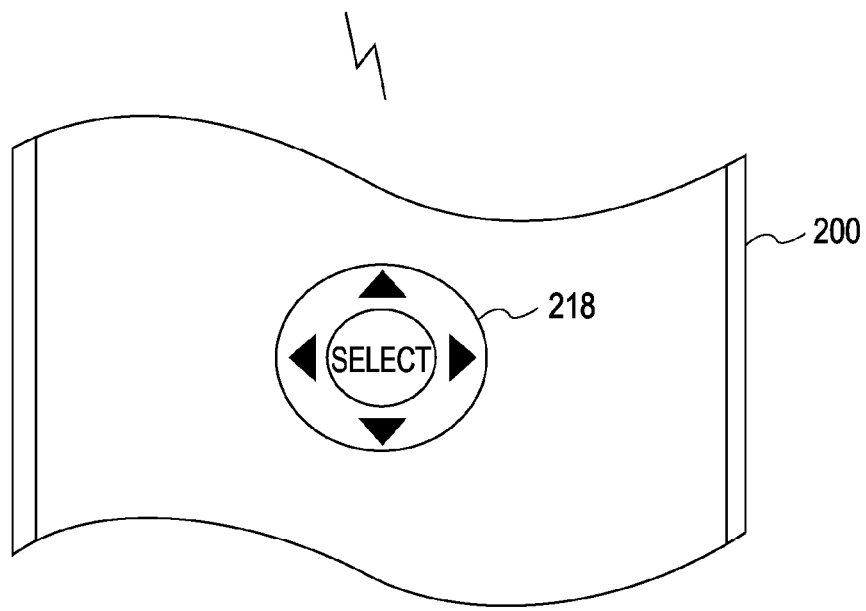

FIG. 7 shows a display screen 300 according to a second embodiment of the present invention. In the second embodiment, a light icon 410 illuminating a selection area 411 is provided. The light icon 410 is only an example, and different icons other than the light icon 410 may be used. As in the case of the first embodiment, link displays 421 to 426 included in the selection area 411 illuminated by the light icon 410 are displayed with frames. Providing the light icon 410 allows the user to naturally accept the selection area 411 that is brighter than surrounding areas.

Figure 8:
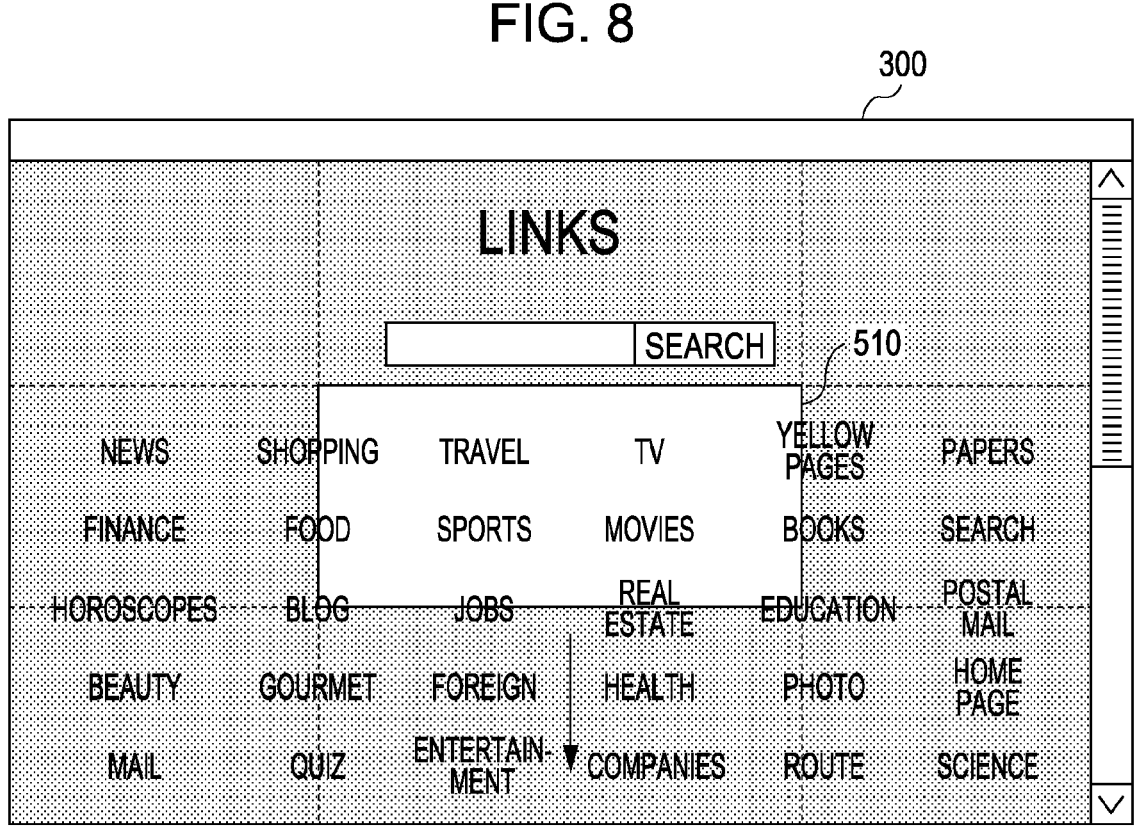
FIG. 8 shows a display screen according to a third embodiment of the present invention.
Figure 8:
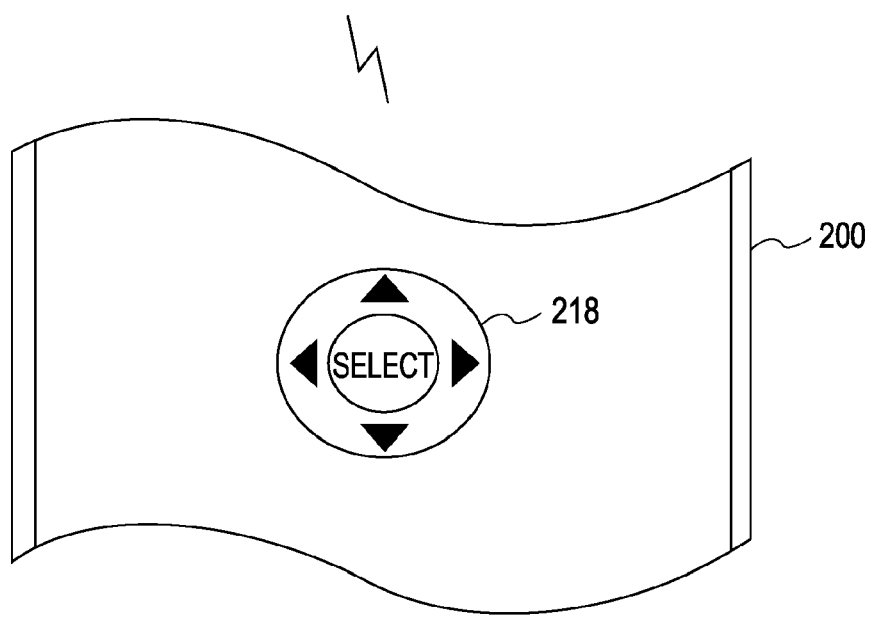

FIG. 8 shows a display screen 300 according to a third embodiment of the present invention. A split selection area display unit 52 described in FIG. 1 implements the screen displayed on the display screen 300 according to the third embodiment of the present invention. Referring to FIG. 8, a content data display area is split into nine areas. The selection area is located at one of these areas. In FIG. 8, the selection area is located at, for example, the center of the nine split areas by default. In the embodiment of the present invention, the number of split areas is not limited to nine, and may be any number.

Users can move a selection area 510 to each split area using an arrow-select buttons 218 of an operation terminal 200. In FIG. 8, the selection area 510 may be configured to be move in four or eight directions.

Figure 9A:
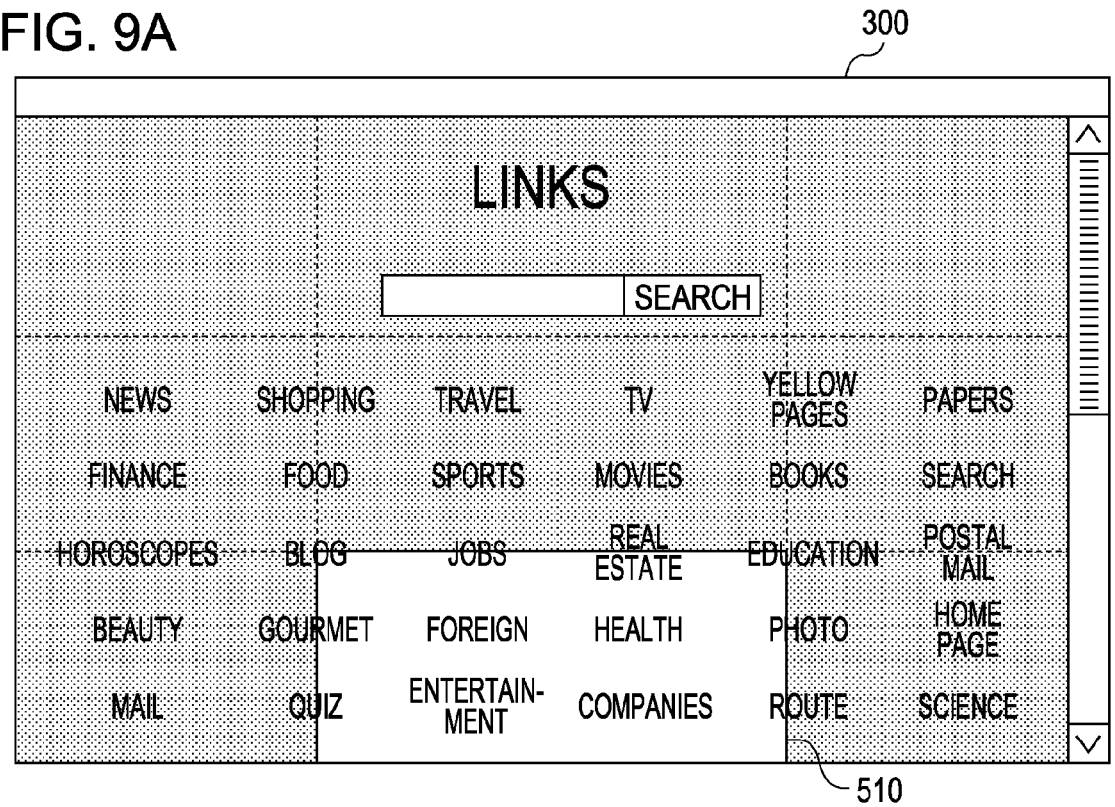
FIGS. 9A and 9B show a process of selecting a link display "COMPANIES" included in content data.
Figure 9B:
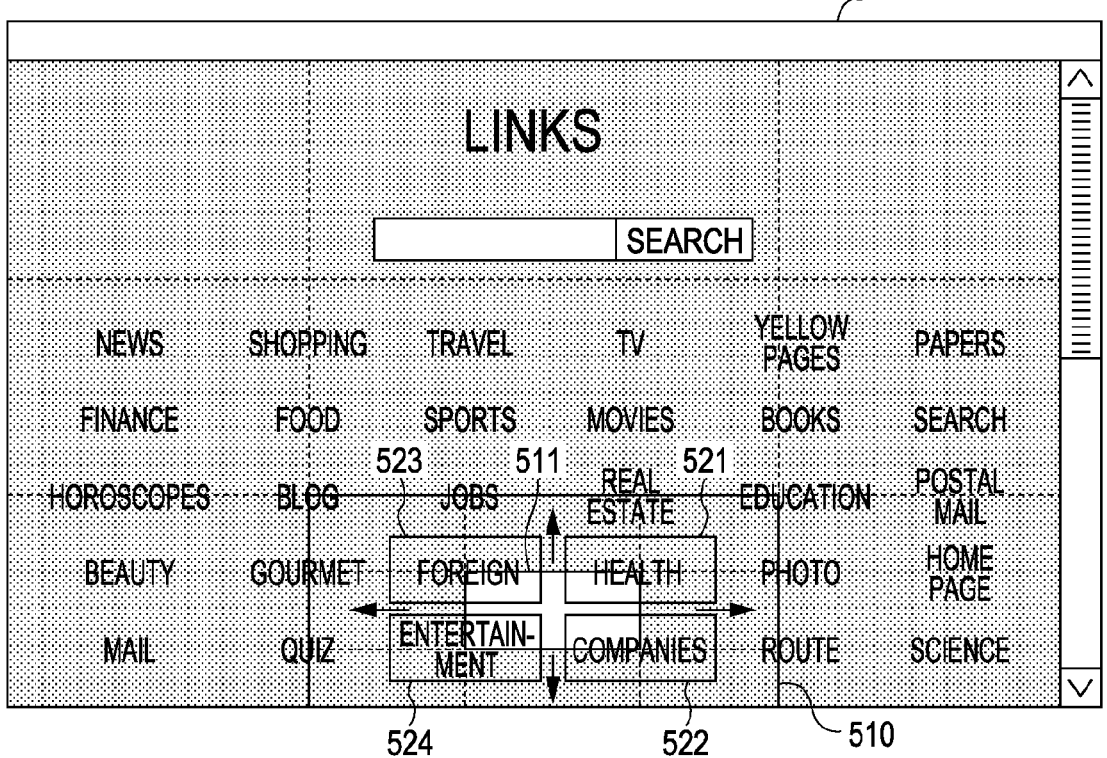

FIGS. 9A and 9B show a process of selecting a link display 522, namely, "COMPANIES" included in the content data. In the default setting, the selection area 510 is located at, for example, the center of the split areas. As shown in FIG. 9A, a user first moves the selection area 510 to the split area including the link display 522, namely, "COMPANIES", with the arrow-select buttons 218 of the operation terminal 200.

After moving the selection area 510 to the split area including the link display 522, namely, "COMPANIES", the user presses the select button of the arrow-select buttons 218 of the operation terminal 200. This causes the split area to be further split into nine sub-areas and a screen shown in FIG. 9B to be displayed. Likewise, a selection area 511 is located at, for example, the center of the split sub-areas by default. The user can move the selection area 511 to each sub-area with the arrow-select buttons 218 of the operation terminal 200. The selection area 511 may be configured to move in four or eight directions.

The link displays 521 to 524 are displayed with frames to indicate that the link displays are included in the selection area 511. Although the link displays located within the selection area 510 are displayed without frames in FIG. 9A, the link displays may be displayed with the frames.

Figure 10:
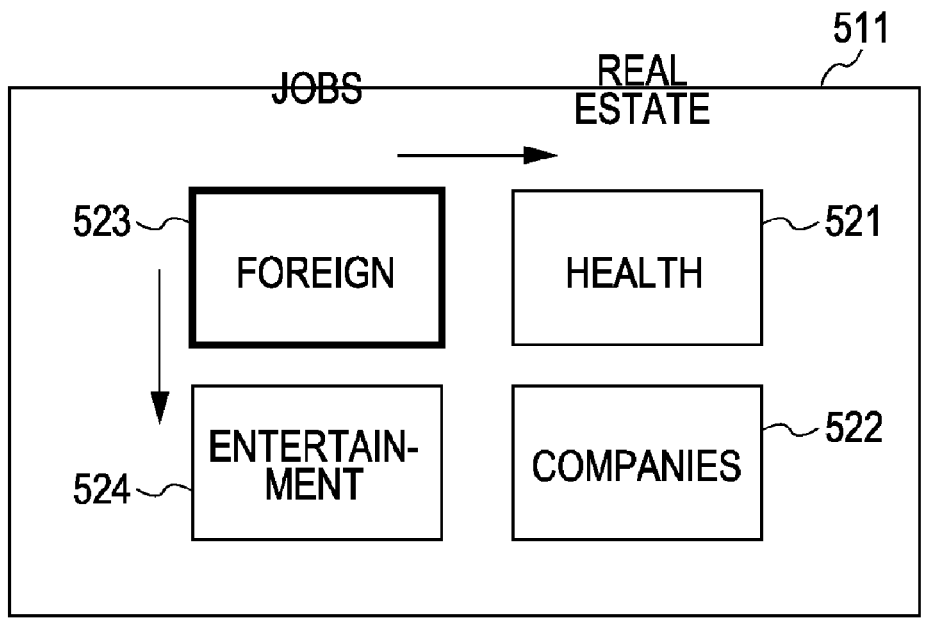
FIG. 10 shows an enlarged view of a selection area shown in FIG. 9B.
Figure 10:
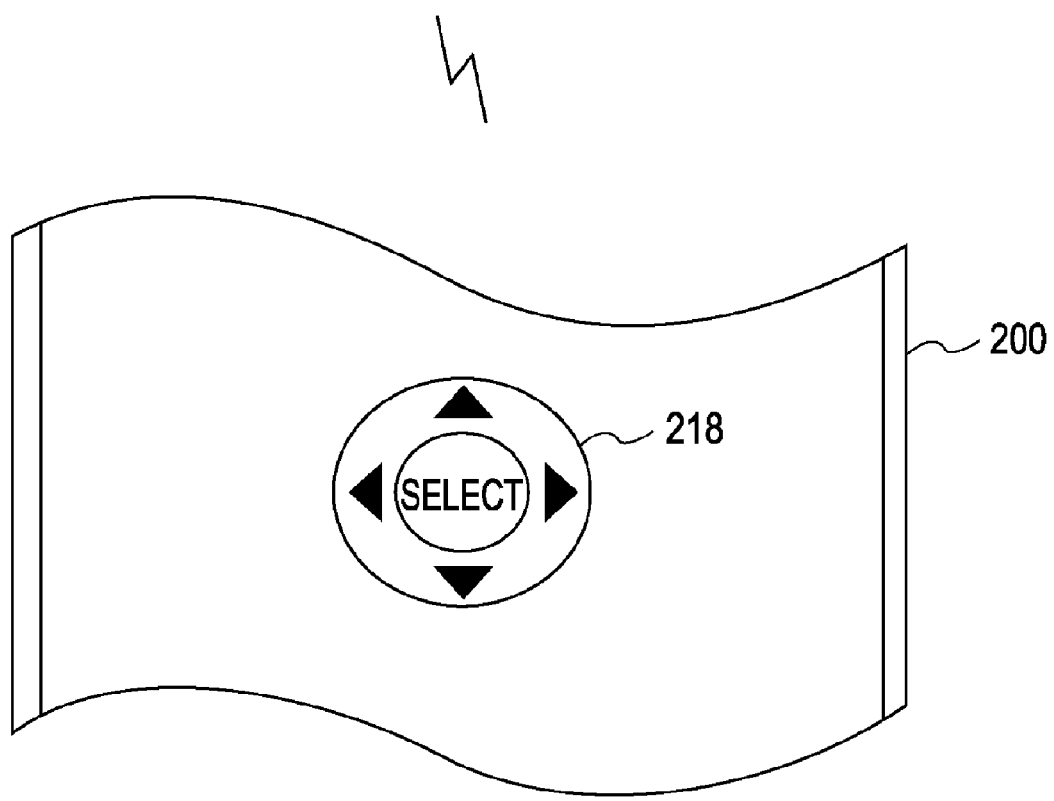

FIG. 10 shows an enlarged view of the selection area 511 shown in FIG. 9B. The user presses the select button of the arrow-select buttons 218 of the operation terminal 200 after placing the selection area 511 at the sub-area including the link display 522, namely, "COMPANIES", as shown in FIG. 9B. By this operation, the brightness of the selection area 511 and that of the surrounding area become the same, and one of the frames attached to the link displays 521 to 524 is thickened.

The user moves the thick frame display to the link display 522, namely, "COMPANIES", with the arrow-select buttons 218 of the operation terminal 200 and presses the select button of the arrow-select buttons 218 of the operation terminal 200. By this operation, the link display 522, namely, "COMPANIES", is selected, and content data corresponding to the link display 522, namely, "COMPANIES", is displayed on the Web browser.

Figure 11A:
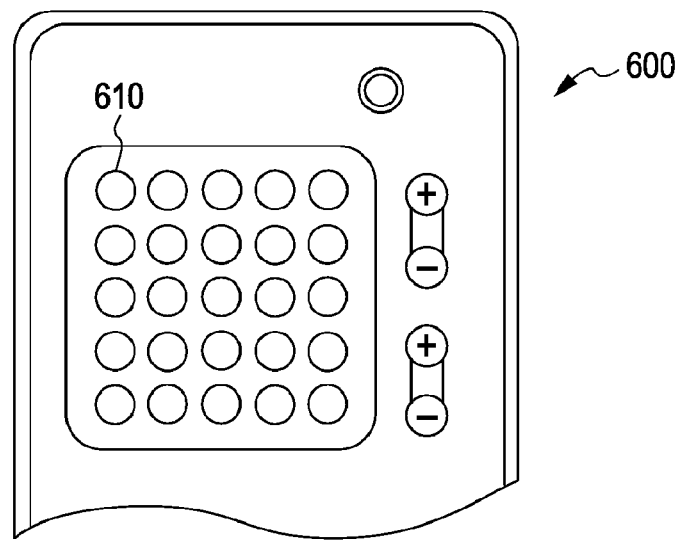
FIG. 11A shows an operation terminal according to another embodiment of the present invention.

FIG. 11A shows an operation terminal 600 according to another embodiment of the present invention. As shown in FIG. 11A, the operation terminal 600 has PreSenses 610 instead of a numeric keypad 212 provided on an operation terminal 200 shown in FIG. 4. The operation terminal 600 has the same configuration as the operation terminal 200 except for the PreSenses 610. Thus, the explanation for the same configuration is omitted. The operation terminal 600 corresponds to the operation terminal shown in FIG. 1.

Each PreSense 610 is a key having a function to output different operation signals depending on pressure levels, i.e., low pressure or high pressure, applied thereto. For example, the low pressure is caused by touching the PreSense 610, whereas the high pressure is caused by pressing the PreSense 610. Referring to FIG. 11A, the operation terminal 600 has twenty five PreSenses 610 disposed in a 5×5 matrix thereon. However, the disposition of the PreSenses 610 is not limited to this particular configuration. For example, just like known TV remote controls, the operation terminal 600 may have twelve PreSenses 610 disposed in a 3×4 matrix thereon.

Figure 11B:
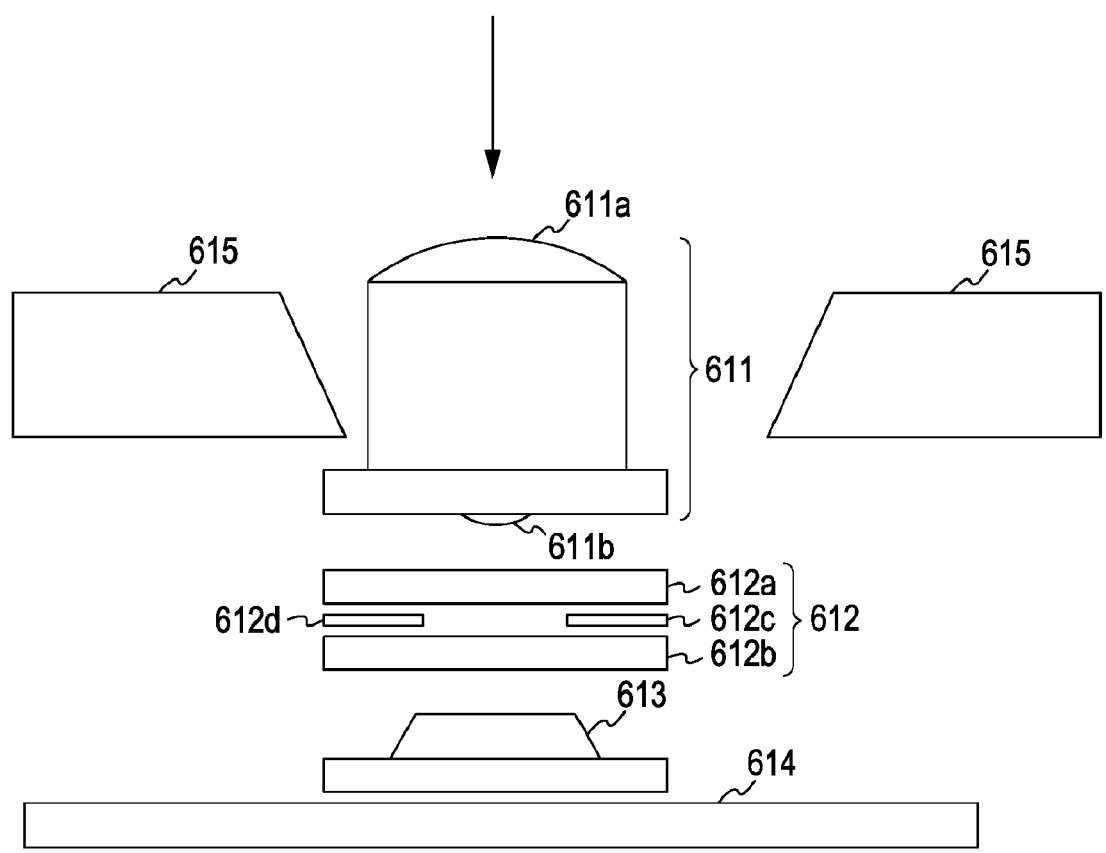
FIG. 11B shows an example sectional view of a PreSense.

FIG. 11B shows an example of a sectional view of the PreSense 610. The PreSense 610 has a key 611, a pressure-sensitive switch 612, a tactile switch 613, and a printed circuit board 614. The key 611 has an upper end 611a and a lower end 611b. The pressure-sensitive switch 612 has low-pressure contact members 612a and 612b and spacers 612c and 612d. A cover 615 protects the pressure-sensitive switch 612, the tactile switch 613, and the printed circuit board 614 from external damage.

The key 611 is a member that a user touches or presses to perform input operations. If the user touches or presses the upper end 611a in the direction of an arrow shown in FIG. 11B, the lower end 611b applies the low pressure or the high pressure, respectively, to the low-pressure contact member 612a. That is, the lower end 611b applies the low pressure or the high pressure to the pressure-sensitive switch 612.

The pressure-sensitive switch 612 has the low-pressure contact members 612a and 612b sandwiching the spacers 612c and 612d therebetween. When the lower end 611b applies no pressure to the pressure-sensitive switch 612, the low-pressure contact members 612a and 612b are separated from each other by the thickness of the spacers 612c and 612d. In such a state, the pressure-sensitive switch 612 is held in an "OFF" state.

The low pressure applied by the lower end 611b curves the low-pressure contact member 612a. As a result, a part near the center of the low-pressure contact member 612a approaches the low-pressure contact member 612b. The spacers 612c and 612d are provided with a predetermined distance. Hence, as the curvature of the low-pressure contact member 612a increases, the part near the center of the low-pressure contact member 612a comes into contact with the low-pressure contact member 612b, which turns on the pressure-sensitive switch 612.

The low-pressure contact member 612a or 612b is connected to a signal output circuit (not shown) provided on the printed circuit board 614. If the pressure-sensitive switch 612 is turned on, an operation signal corresponding to the applied low pressure is output from the signal output circuit (not shown).

Furthermore, pressing the upper end 611a causes the lower end 611b to apply the high pressure to the low-pressure contact member 612a. The low-pressure contact member 612a, in turn, applies the high pressure to the low-pressure contact member 612b. The low-pressure contact member 612b then applies the high pressure to the tactile switch 613. If the applied pressure exceeds a predetermined level, the tactile switch 613 is turned on.

The tactile switch 613 is connected to a signal output circuit (not shown) provided on the printed circuit board 614. If the tactile switch 613 is turned on, an operation signal corresponding to the applied high pressure is output from the signal output circuit (not shown).

Figure 12:
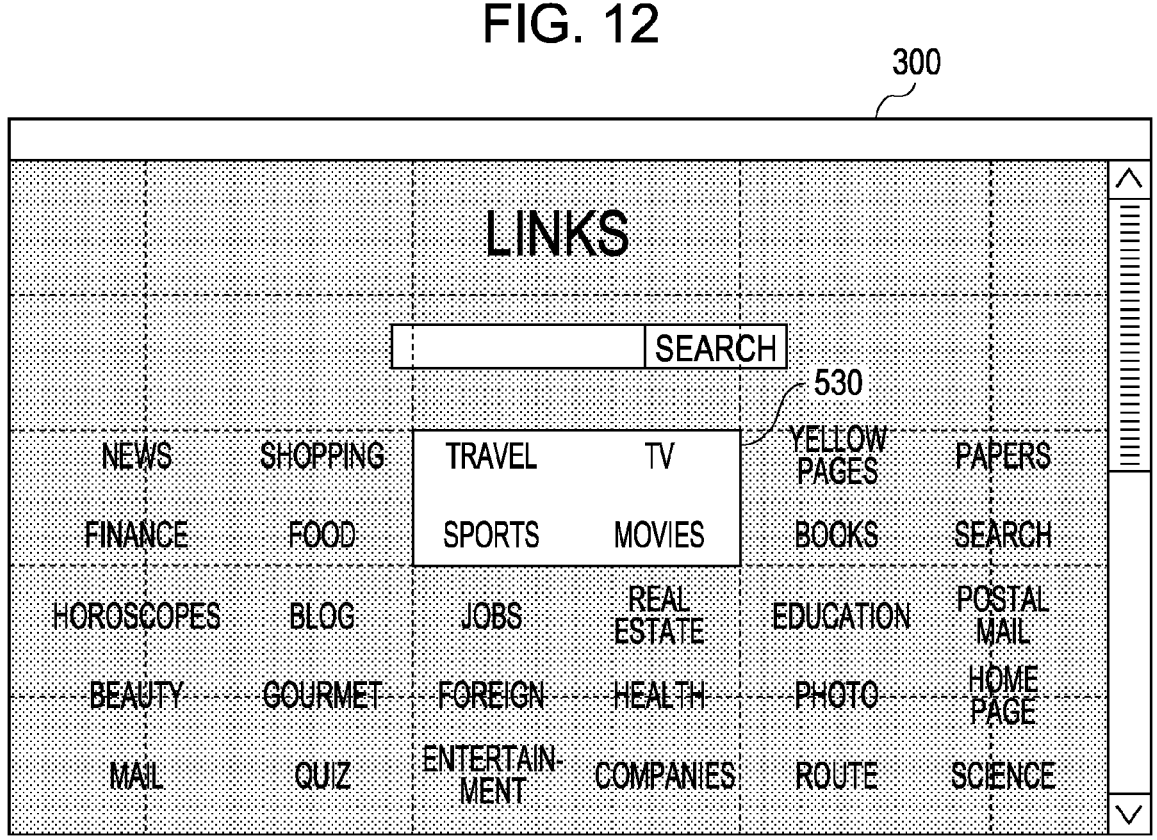
FIG. 12 shows an example operation of an operation terminal.
Figure 12:
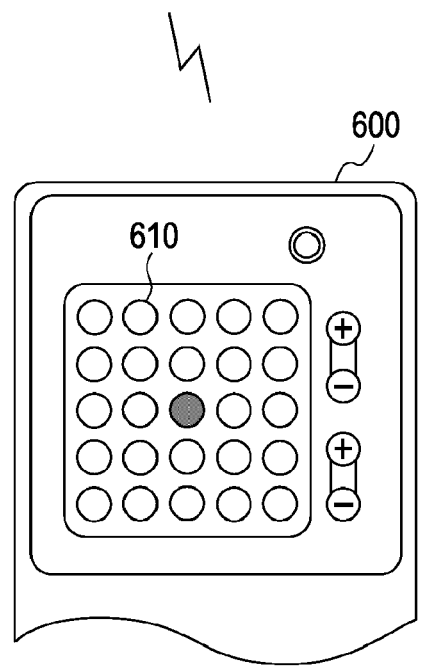

FIG. 12 shows an example operation of the operation terminal 600. Referring to FIG. 12, the content data display area is split into twenty five areas disposed in a 5×5 matrix. The operation terminal 600 also has the PreSenses 610 disposed in a 5×5 matrix. The split areas on the content data display area and the PreSenses 610 have a one-to-one correspondence. If the low pressure is applied to the colored PreSense 610 in the third column third row shown in FIG. 12 by touching the PreSense 610, the selection area 530 is moved to the split area in the third column third row on the content data display area. After moving the selection area 530 to the split area including the target link display, the user presses the PreSense 610 corresponding to this split area, which produces the high pressure. As a result, the split area is further split into twenty five sub-areas as shown in FIG. 9B. The user selects the target link display by pressing the PreSense 610 corresponding to the sub-area including the target link display. A plurality of sub-areas may include one link display depending on the size of the link displays. In such a case, the user can select the target link display by pressing one of the PreSenses 610 corresponding to these sub-areas.

The user can also perform gesture input operations with the PreSenses 610. In the gesture input operation, the user performs key input operations in a predetermined order using a remote control having at least two keys. For example, in order to perform the gesture input operation, the user continuously performs successive key input operations on keys disposed next to each other. One gesture input operation is associated with a predetermined request.

The operation terminal 600 capable of sending requests to a target apparatus with the gesture input operations may have a buffer for chronologically storing the output signals each corresponding to the PreSense operated in the course of the gesture input operation, and a table for associating the output signal sequences of the gesture input operations and the requests. If the user applies the low pressure or the high pressure to the PreSense by touching or pressing the PreSense, respectively, the operation signal for the operated PreSense is output and stored in the buffer. When the user performs the gesture input operation, the buffer chronologically stores a plurality of operation signals (i.e., an operation signal sequence) corresponding to the operated PreSenses. If the table has the same operation signal sequences as those, having the chronologically arranged operation signals, stored in the buffer, the requests associated with the operation signal sequences are sent to the target apparatus.

Now, referring back to FIG. 12, the process of the operation with the gesture input operation is described. If the user performs the gesture input operation to the right on the PreSenses 610 in the first row, a request for moving the selection area 530 to the right is sent to the information processing apparatus 100. As a result, the selection area 530 is moved to the right. Likewise, if the user performs the gesture input operation in the vertical direction, the selection area 530 is also moved in the vertical direction. The user can select the target link display by pressing the PreSense 610 after moving the selection area with the gesture input operation. As described above, utilization of the gesture input operations allows the user to easily move the selection area 530, even if the content data display area is split into many (i.e., twenty five) areas.

Figure 13:
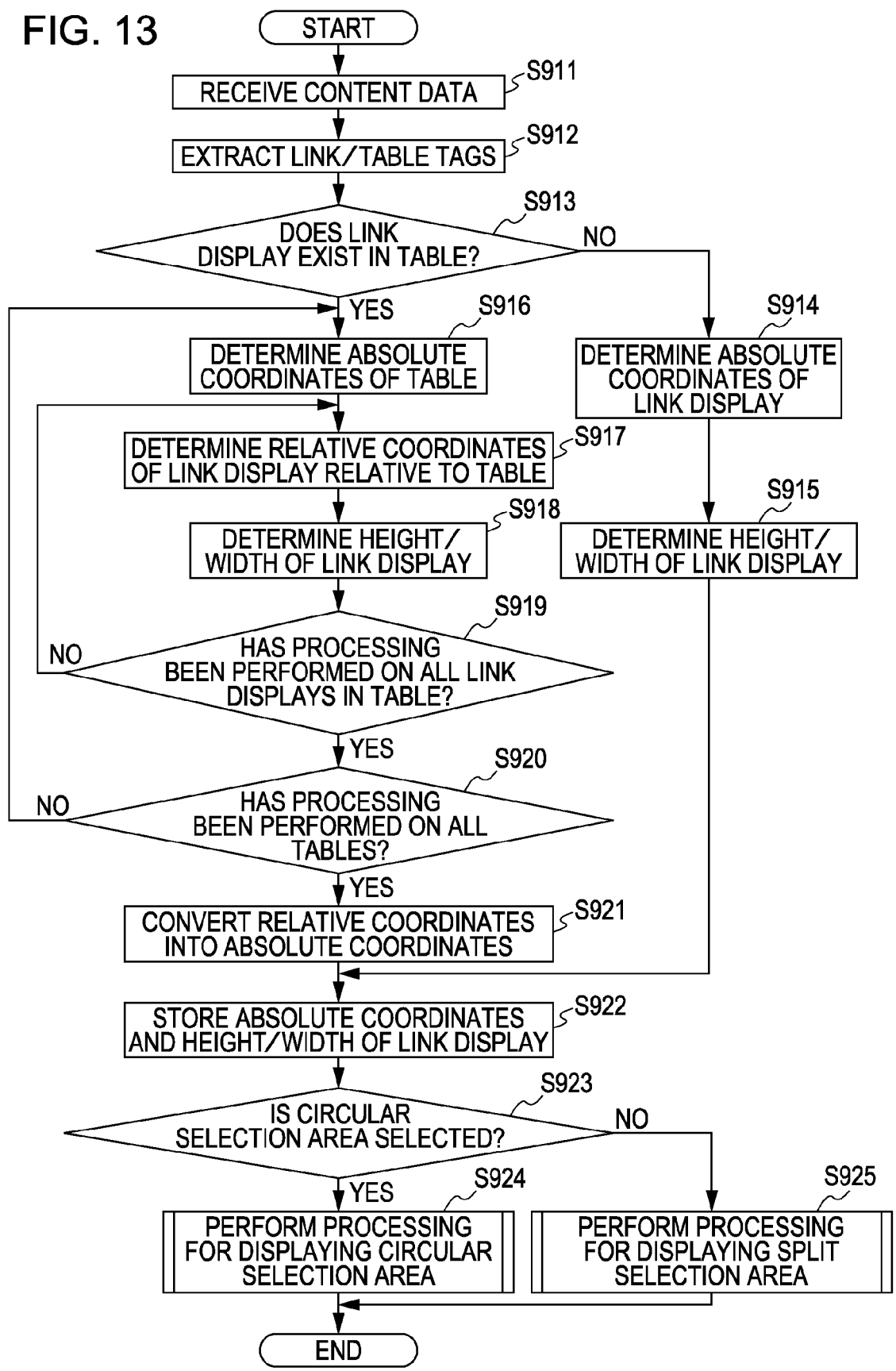
FIG. 13 is a flowchart showing a process, starting with reception of content data, executed by an information processing apparatus according to a first embodiment of the present invention.

FIG. 13 is a flowchart showing a process, starting with the reception of content data, executed by the image processing apparatus 100 according to the first embodiment of the present invention. In the following explanation, it is assumed that the content data includes data written in HTML.

When the information processing apparatus 100 receives the content data (step S911), the position information extracting unit 31 extracts the tags of links and tables from the content data (step S912). Then, the link displays included in the tables are separated (step S913).

If the link display is not included in the table, the link display absolute coordinate determiner 36 determines the absolute coordinates of the link display (step S914). In addition, the link display size determining unit 32 determines the height and width of the link display (step S915). The link display position information storage section 40 then stores the absolute coordinates and the height and width of the link display determined at steps S914 and S915 (step S922).

If the link display is included in the table, the table absolute coordinate determiner 34 determines the absolute coordinates of the predetermined point of the table on the basis of the tag of the table (step S916). Then, the link display relative coordinate determiner 35 determines the relative coordinates of the link display included in the predetermined table (step S917). In addition, the link display size determining unit 32 determines the height and width of the link display (step S918).

After performing the above steps, whether the processing at steps S917 and S918 has been performed on all of the link displays included in the predetermined table or not is determined (step S919). If the information processing apparatus 100 determines that the processing at steps S917 and S918 has not been performed on all of the link displays included in the predetermined table, the processing at steps S917 and S918 is performed on those link displays. In contrast, if the information processing apparatus 100 determines that the processing at steps S917 and S918 has been performed on all of the link displays included in the predetermined table, whether the processing at step S916 has been performed on all of the tables included in the content data or not is determined (step S920).

If the information processing apparatus 100 determines that the processing at step S916 has not been performed on all of the tables included in the content data, the process returns to step S916. In contrast, if the information processing apparatus 100 determines that the processing at step S916 has been performed on all of the tables included in the content data, the relative coordinates of the link display determined at step S917 are converted into the absolute coordinates (step S921). The link display position information storage section 40 then stores the converted absolute coordinates and the height and width of the link display determined at step S918 (step S922).

The display selecting unit 83 selects either the circular selection area display unit 51 or the split selection area display unit 52 to be used for displaying the selection area on the basis of the operation signal sent from the operation terminal

200 (step S923). If the circular selection area display unit 51 is selected, the circular selection area display unit 51 executes predetermined processing (step S924). If the split selection area display unit 52 is selected, the split selection area display unit 52 executes predetermined processing (step S925).

Figure 14:
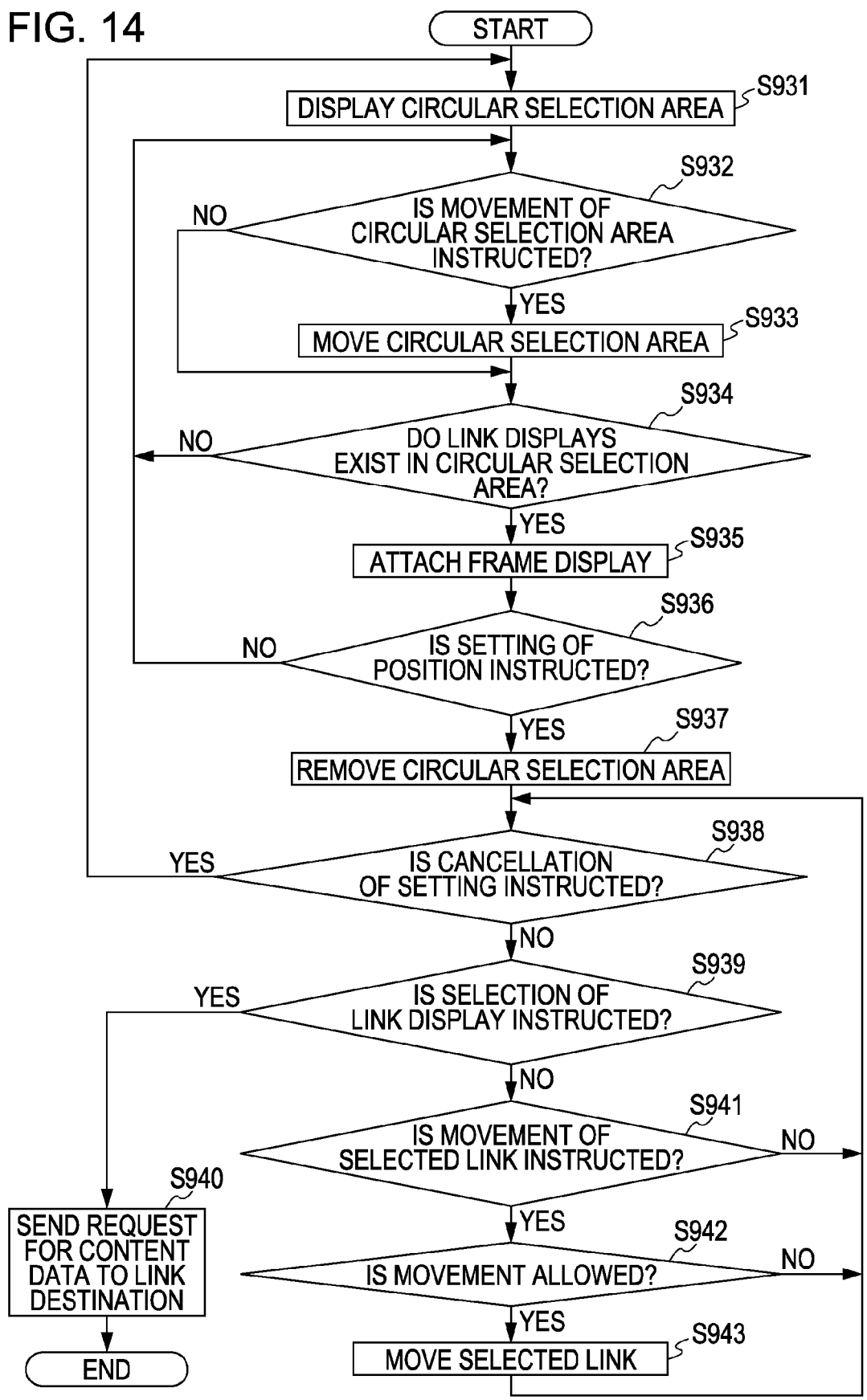
FIG. 14 is a flowchart showing a process executed by a circular selection area display unit.

FIG. 14 is a flowchart showing a process executed by the circular selection area display unit 51. The circular selection area display unit 51 first displays a circular selection area in the content data display area of the Web browser (step S931). At this time, the selection area may be displayed brighter than the surrounding area.

The circular selection area display unit 51 then determines whether an instruction to move the selection area is given by the direction instructing unit 81 (step S932). If the instruction to move the selection area is given by the direction instructing unit 81, the circular selection area display unit 51 moves the selection area (step S933).

The link selection controlling section 60 determines whether the link displays exist in the selection area (step S934). If the link displays are determined to exist in the selection area, the link selection controlling section 60 notifies the circular selection area display unit 51 of these link displays. The circular selection area display unit 51, in turn, displays these link displays with frames (step S935). Meanwhile, the manner of displaying the link displays at step S935 is not limited to the frame display, and the above-described color display may be used. If the link selection controlling section 60 determines that no link displays exist in the selection area, the process returns to step S932.

After performing step S935, the circular selection area display unit 51 determines whether an instruction to set the position of the selection area is given by the operation deciding unit 82 (step S936). If the instruction to set the position of the selection area is given by the operation deciding unit 82, the circular selection area display unit 51 stops displaying the selection area (step S937). Accordingly, only the content data and the frames attached to link displays are displayed in the content data display area of the Web browser. In addition, one of the frames attached to the link displays is thickened.

The circular selection area display unit 51 then determines whether an instruction to cancel the position of the selection area currently set is given by the operation deciding unit 82 (step S938). If the instruction to cancel the position of the selection area is given by the operation deciding unit 82, the process returns to step S931, and the circular selection area display unit 51 displays the circular selection area again. In contrast, if the instruction to cancel the position of the selection area is not given by the operation deciding unit 82, the link selection controlling section 60 determines whether or not an instruction to select the link display with the thick frame is given by the operation deciding unit 82 (step S939). If the link selection controlling section 60 determines that the instruction to select the link display with the thick frame is given by the operation deciding unit 82, a request for replying content data is sent to the link destination corresponding to the selected link display (step S940).

Upon determining that the instruction to select the link display with the thick frame is not given by the operation deciding unit 82 at step S939, the link selection controlling section 60 determines whether an instruction to move the thick frame display to another link display is given by the direction instructing unit 81 (step S941). Upon determining that the instruction to move the thick frame display to another link display is given by the direction instructing unit 81, the link selection controlling section 60 further determines whether the movement of the thick frame display to the instructed link display is allowed or not (step S942). That is, after setting the position of the selection area at step S936, the selectable link displays are limited to those included in the selection area. Thus, whether the movement of the thick frame display to the link display instructed at step S941 is allowed or not is determined. If the movement to the instructed link display is allowed, the thick frame display is moved to the instructed link display (step S943), and the process returns to step S938.

Figure 15:
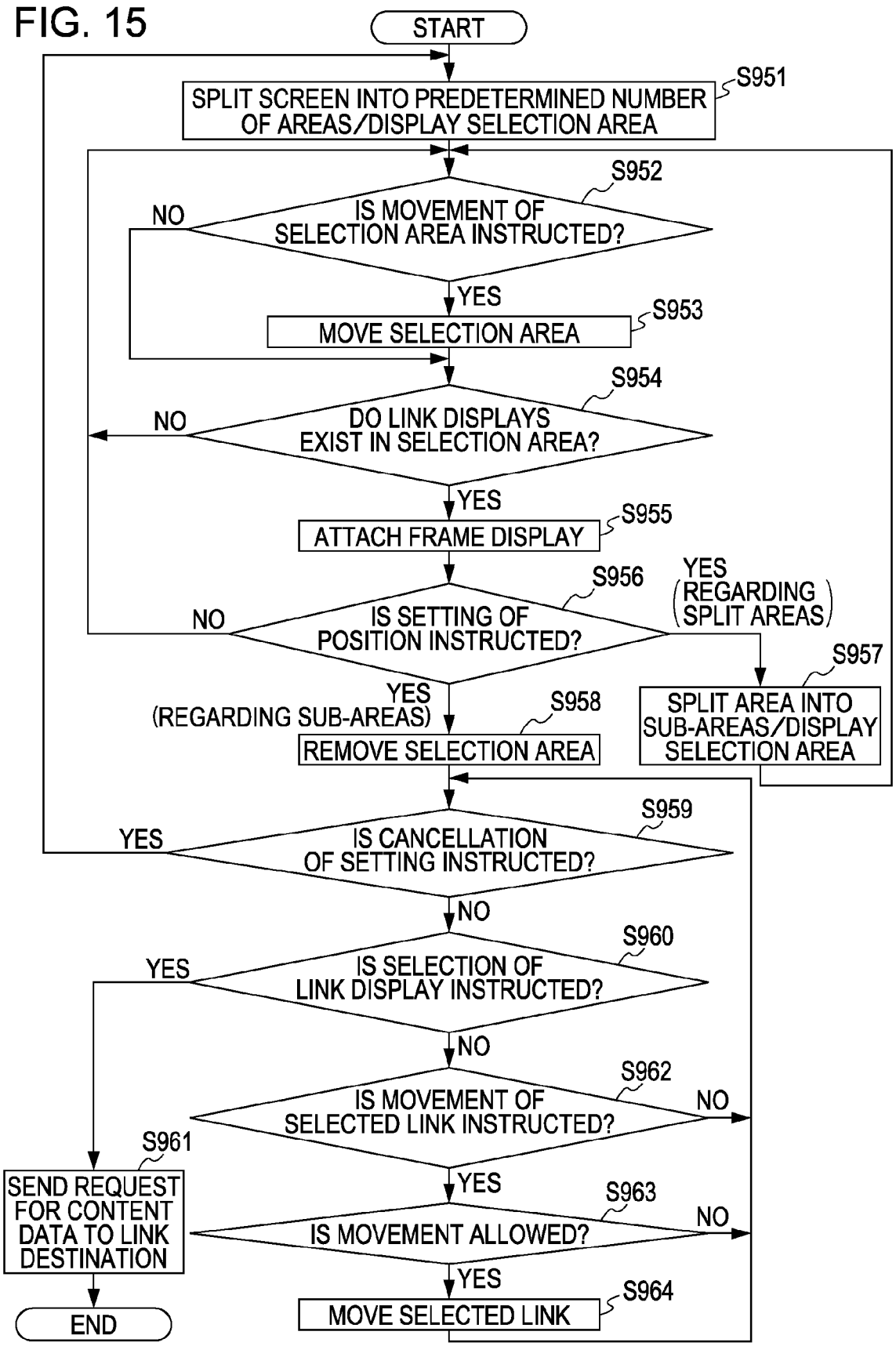
FIG. 15 is a flowchart showing a process executed by a split selection area display unit.

FIG. 15 is a flowchart showing a process executed by the split selection area display unit 52. The split selection area display unit 52 first splits the content data display area of the Web browser into a predetermined number of areas (hereinafter, referred to as "split areas"), and displays a selection area at one of these split areas (step S951).

The split selection area display unit 52 then determines whether an instruction to move the selection area is given by the direction instructing unit 81 (step S952). Upon determining that the instruction to move the selection area is given by the direction instruction unit 81, the split selection area display unit 52 moves the selection area on a split area basis (step S953).

The link selection controlling section 60 determines whether the link displays exist in the selection area (step S954). If the link displays is determined to exist in the selection area, the link selection controlling section 60 notifies the split selection area display unit 52 of these link displays. The split selection area display unit 52, in turn, displays these link displays with the frames (step S955). Meanwhile, the manner of displaying these link displays at step S955 is not limited to the frame display, and the above-described color display may be used. If no link displays are determined to exist in the selection area, the process returns to step S952.

After performing step S955, the split selection area display unit 52 determines whether an instruction to set the position of the selection area is given by the operation deciding unit 82 (step S956). If the instruction to set the position of the selection area is not given by the operation deciding unit 82, the process returns to step S952. In contrast, if the instruction to set the position of the selection area regarding the split areas is given by the operation deciding unit 82, the split selection area display unit 52 further splits the selected split area into a predetermined number of areas (hereinafter, referred to as "sub-areas"), and displays the selection area at one of the sub-areas (step S957). Then, the process returns to step S952, and the processing at steps S952 to S956 is performed on the sub-areas.

If the instruction to set the position of the selection area regarding the sub-areas is given by the operation deciding unit 82, the split selection area display unit 52 stops displaying the selection area (step S958). Accordingly, only the content data and the frames attached to the link displays are displayed in the content data display area of the Web browser. In addition, one of the frames attached to the link displays is thickened.

The split selection area display unit 52 then determines whether an instruction to cancel the position of the selection area currently set is given by the operation deciding unit 82 (step S959). If the instruction to cancel the position of the selection area is given by the operation deciding unit 82, the process returns to step S951. In contrast, if the instruction to cancel the position of the selection area is not given by the operation deciding unit 82, the link selection controlling section 60 determines whether an instruction to select the link display with the thick frame is given by the operation deciding unit 82 (step S960). If the link selection controlling section 60 determines that the instruction to select the link display with the thick frame is given by the operation deciding unit 82, a request for replying content data is sent to the link destination corresponding to the selected link display (step S961).

Upon determining that the instruction to select the link display with the thick frame is not given by the operation deciding unit 82 at step S960, the link selection controlling section 60 determines whether an instruction to move the thick frame display to another link display is given by the direction instructing unit 81 (step S962). Upon determining that the instruction to move the thick frame display to another link display is given by the direction instructing unit 81, the link selection controlling unit 60 determines whether the movement is allowed or not(step S963). That is, after setting the position of the selection area regarding the sub-areas at step S956, the selectable link displays are limited to those included in the selection area. Thus, whether the movement instructed at step S962 is allowed or not is determined. If the movement of the thick frame display to the instructed link display is allowed, the thick frame display is moved to the instructed link display (step S964), and the process returns to step S959.

As described above, the embodiments of the present invention allow users to easily select a link display in content data having many link displays. More specifically, since the selection area has a certain size, the user can easily place the selection area over a target link display even at a high moving speed. The user then selects the target link display from only those included in the selection area. Accordingly, the user can easily select the target link display.

In addition, the information processing apparatus 100 according to the first embodiment of the present invention can be applied not only to TVs that have a Web browsing function but also to car navigation systems that utilize many clickable objects.

Furthermore, the above embodiments have been merely shown as examples embodying the present invention. Although there is the correspondence between the features of the claims and the specific elements described in embodiments of the present invention as discussed below, the present invention is not limited to these particular configurations, and various modifications can be made without departing from the sprit of the present invention.

According to an embodiment of the present invention, receiving means and sending means correspond to, for example, the communication section 10. Selection area movement instructing means or link selection instructing means corresponds to, for example, the direction instructing unit 81 and the operation deciding unit 82. Additionally, selection area displaying means and link display position information extracting means correspond to, for example, the selection area display section 50 and the link display position information extracting section 30, respectively. Furthermore, link selection controlling means corresponds to, for example, the link selection controlling section 60.

According to another embodiment of the present invention, circular selection area displaying means and the split selection area displaying means correspond to, for example, the circular selection area display unit 51 and the split selection area display unit 52, respectively. Additionally, display selecting means corresponds to, for example, the display selecting unit 83.

According to still another embodiment of the present invention, position information extracting means, the link display size determining means, and the link display coordinate determining means correspond to, for example, the position information extracting unit 31, the link display size determining unit 32, and the link display coordinate determining unit 33, respectively.

According to yet another embodiment of the present invention, table absolute coordinate determining means, link display relative coordinate determining means, and link display absolute coordinate determining means correspond to, for example, the table absolute coordinate determiner 34, the link display relative coordinate determiner 35, and the link display absolute coordinate determiner 36, respectively.

According to a further embodiment of the present invention, receiving means and sending means correspond to, for example, the communication section 10. Selection area movement instructing means or link selection instructing means corresponds to, for example, the direction instructing unit 81 and the operation deciding unit 82. Additionally, the selection area displaying means, link display position information extracting means, and link selection controlling means correspond to, for example, the selection area display section 50, the link display position information extracting section 30, and the link selection controlling section 60, respectively. Moreover, an operation terminal corresponds to, for example, the operation terminal 200.

According to a still further embodiment, an operation terminal and an information processing apparatus correspond to, for example, the operation terminal 200 and the information processing apparatus 100, respectively. A link display position information extracting step corresponds to, for example, steps S912 to S921. Additionally, a selection area movement instructing step corresponds to, for example, step S932 or S952. A selection area displaying step corresponds to, for example, step S933 or S953. A link selection instructing step corresponds to, for example, steps S939 and S941 or steps S960 and S962. A link selecting step corresponds to, for example, steps S942 and S943 or steps S963 and S964. A sending step corresponds to, for example, step S940 or S961.

The process described in the above embodiments of the present invention may be viewed as a method including a series of steps, a program for allowing a computer to execute the series of steps, or a recording medium storing the program.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a receiving section for receiving content data from a Web server;
a selection area movement instructing section for receiving a first operation signal to instruct movement of a predetermined selection area displayed in an area where the content data is displayed, and for giving a first instruction corresponding to the first operation signal, wherein said predetermined selection area has a position; a selection area displaying section for moving and displaying the predetermined selection area according to the first instruction given by the selection area movement instructing section;
a link display position information extracting section for analyzing the content data, and for extracting, from the content data, a plurality of display position information, wherein the plurality of display position information includes:
  (i) first display position information of a first link display; and
  (ii) second display position information of a second link display, wherein said first display position information and said display position information are included in the content data, and wherein the predetermined selection area is sized to accommodate:
    (i) said first link display; and
    (ii) said second link display located in different positions within the selection area;
a setting selection section for receiving a second operation signal to instruct a setting of the position of the predetermined selection area, and of giving a second instruction corresponding to the second operation signal;
a link selection instructing section for receiving a third operation signal to instruct a selection of one of said plurality of different predetermined links, said one of the plurality of different predetermined links being limited to any one of the plurality of different link displays included in the content data and displayed within the set predetermined selection area, and for giving a third instruction corresponding to the third operation signal, wherein said third instruction is given after the position of the predetermined selection area which accommodates the plurality of different links is set;
a link selection controlling section for selecting the predetermined link instructed by the link selection instructing section when the link display corresponding to the predetermined link to be selected is displayed within the predetermined selection area; and
a sending section for sending, to a link destination of the predetermined link selected by the link selection controlling section, a request for replying content data that the link destination stores wherein the selection area displaying section has:
  a circular selection area displaying section for moving and displaying the circular selection area according to the first instruction given by the selection area movement instructing section, and
  a split selection area displaying section for splitting the area where the content data is displayed into a predetermined number of areas, for displaying the circular selection area in one of the split areas, and for moving the circular selection area on a split area basis according to the first instruction given by the selection area movement instructing section, the information processing apparatus further comprising:
  a display selecting section for receiving a fourth operation signal to instruct a selection of either the circular selection area displaying section or the split selection area displaying section, and for making the selection according to the fourth operation signal.

2. The information processing apparatus of claim 1, wherein the selection area displaying section displays the predetermined selection area such that the brightness of the selection area and that of an area surrounding the selection area differ.

3. The information processing apparatus of claim 1, wherein the predetermined selection area is circular.

4. The information processing apparatus of claim 1, wherein the selection area displaying section:
  (i) splits the area where the content data is displayed into a predetermined number of areas,
  (ii) displays the predetermined selection area in one of the split areas, and
  (iii) moves the predetermined selection area on a split area basis according to the first instruction given by the selection area movement instructing section.

5. The information processing apparatus of claim 4, wherein the selection area displaying section:
  (i) further splits the split area into a predetermined number of sub-areas,
  (ii) displays the selection area in one of the sub-areas, and
  (iii) moves the predetermined selection area on a sub-area basis according to the first instruction given by the selection area movement instructing section.

6. The information processing apparatus of claim 1, wherein the selection area displaying section changes the size of the predetermined selection area according to the display size of the content data.

7. The information processing apparatus of claim 1, wherein the selection area displaying section displays an icon associated with the selection area.

8. The information processing apparatus of claim 1, wherein the link display position information extracting section has:
  a position information extracting section for extracting, from the content data, the position information that defines the display positions of the first link display and the second link display,
  a link display size determining section for determining the height and width of the first link display and the second link display on the basis of the position information, and
  a link display coordinate determining section for determining the absolute coordinates of the first link display and the second link display in the area where the content data is displayed on the basis of the position information.

9. The information processing apparatus of claim 8, wherein the content data includes data written in Hyper Text Markup Language.

10. The information processing apparatus of claim 9, wherein the link display coordinate determining section has:
  a table coordinate determining section for determining the absolute coordinates of a table in the area where the content data is displayed on the basis of the position information of the table extracted from the data written in Hyper Text Markup Language included in the content data,
  a link display relative coordinate determining section for determining the relative coordinates of the first link display and the second link display relative to the table on the basis of the position information of the link extracted from the data written in Hyper Text Markup Language included in the content data, and
  a link display absolute coordinate determining section for determining the absolute coordinates of the first link display and the second link display in the area where the content data is displayed on the basis of the relative coordinates of the link display and the absolute coordinates of the table.

11. The information processing apparatus of claim 10, wherein, regarding the link displays not included in the table, the link display absolute coordinate determining section determines the absolute coordinates of the first link display and the second link display in the area where the content data is displayed on the basis of the position information of the link extracted from the data written in Hyper Text Markup Language included in the content data.

12. The information processing apparatus of claim 1, wherein the link selection controlling section gives a fourth instruction to display the first link display and the second link display located within the set predetermined selection area with an indication to show the link display is located within the set predetermined selection area.

13. The information processing apparatus of claim 1, wherein the operation signals correspond to operation signals used in infrared communication.

14. An information processing system comprising:
an information processing apparatus having:
a receiving section for receiving content data from a Web server,
a selection area movement instructing section for receiving a first operation signal to instruct movement of a predetermined selection area displayed in an area where the content data is displayed, and for giving a first instruction corresponding to the first operation signal, wherein said predetermined selection area has a position,
a selection area displaying section for moving and displaying the predetermined selection area according to the first instruction given by the selection area movement instructing section,
a link display position information extracting section for analyzing the content data, and for extracting, from the content data, a plurality of display position information, wherein the plurality of display position information includes:
(i) first display position information of a first link display, and
(ii) second display position information of a second link display, wherein said first display position information and said display position information are included in the content data, and wherein the predetermined selection area is sized to accommodate:
(i) said first link display; and
(ii) said second link display located in different positions within the selection area,
a setting selection section for receiving a second operation signal to instruct a setting of the position of the predetermined selection area, and of giving a second instruction corresponding to the second operation signal,
a link selection instructing section for receiving a third operation signal to instruct a selection of one of said plurality of different predetermined links, said one of the plurality of different predetermined links being limited to any one of the plurality of different link displays included in the content data and displayed within the set predetermined selection area, and for giving a third instruction corresponding to the third operation signal, wherein said third instruction is given after the position of the predetermined selection area which accommodates the plurality of different links is set a link selection controlling section for selecting the predetermined link instructed by the link selection instructing section when the link display corresponding to the predetermined link to be selected is displayed within the predetermined selection area, and
a sending section for sending, to a link destination of the predetermined link selected by the link selection controlling section, a request for replying content data that the link destination stores; and
an operation terminal for sending:
(i) the first operation signal to instruct the movement of the selection area
(ii) the second operation signal to instruct the setting of the position of the predetermined selection area; and (iii) the third operation signal to instruct the selection of one of said plurality of different predetermined links included in the content data wherein the selection area displaying section has:
a circular selection area displaying section for moving and displaying the circular selection area according to the first instruction given by the selection area movement instructing section, and
a split selection area displaying section for splitting the area where the content data is displayed into a predetermined number of areas, for displaying the circular selection area in one of the split areas, and for moving the circular selection area on a split area basis according to the first instruction given by the selection area movement instructing section, the information processing apparatus further comprising:
a display selecting section for receiving a fourth operation signal to instruct a selection of either the circular selection area displaying section or the split selection area displaying section, and for making the selection according to the fourth operation signal.

15. A processing method for an information processing apparatus that selects a link displayed in an area where content data received from a Web server is displayed according to a plurality of operation signals sent from an operation terminal, and sends, to a link destination of the selected link, a request for replying predetermined content data, the plurality of operation signals including:
(i) a first operation signal sent from said operation terminal;
(ii) a second operation signal sent from the operation terminal; and
(iii) a third operation signal sent from said operation terminal, the processing method comprising:
a link display position information extracting step of analyzing the content data, and of extracting, from the content data, a plurality of display position information, wherein the plurality of display position information includes:
(i) first display position information of a first link display; and
(ii) second display position information of a second link display, wherein the first display position information and the second display position information are included in the content data;
a selection area movement instructing step of receiving the first operation signal to instruct movement of a predetermined selection area displayed in the area where the content data is displayed, and of giving a first instruction corresponding to the first operation signal, wherein said predetermined selection area has a position;
a selection area displaying step of moving and displaying the predetermined selection area according to the first instruction given in the selection area movement instructing step, the predetermined selection area being sized to accommodate:
(i) said first link display; and
(ii) said second link display located in different positions within the predetermined selection area;
a setting selection instruction step of receiving the second operation signal to instruct a setting of the position of the predetermined selection area, and of giving a second instruction corresponding to the second operation signal;

after the position of the predetermined selection area which accommodates the plurality of different links is set, a link selection instructing step of receiving the third operation signal to instruct a selection of one of said plurality of different predetermined links, said one of the plurality of different predetermined links being limited to any one of the plurality of different link displays displayed in the area where the content data is displayed and within the set predetermined selection area, and of giving a third instruction corresponding to the third operation signal;

a link selecting step of selecting the predetermined link instructed in the link selection instructing step when the link display corresponding to the predetermined link to be selected is displayed within the predetermined selection area; and sending step of sending, to the link destination of the selected predetermined link, a request for replying predetermined content data wherein the selection area displaying step has:

a circular selection area displaying step for moving and displaying the circular selection area according to the first instruction given by the selection area movement instructing step, a split selection area displaying step for splitting the area where the content data is displayed into a predetermined number of areas, for displaying the circular selection area in one of the split areas, and for moving the circular selection area on a split area basis according to the first instruction given by the selection area movement instructing step, and a display selecting step for receiving a fourth operation signal to instruct a selection of either the circular selection area displaying step or the split selection area displaying step, and for making the selection according to the fourth operation signal.

16. A computer program product stored on a computer-readable medium including executable instructions that when executed by a processor performs steps for allowing an information processing apparatus, which selects a link displayed in an area where content data received from a Web server is displayed according to a plurality of operation signals sent from an operation terminal, and sends, to a link destination of the selected link, a request for replying predetermined content data, the plurality of operation signals including:

(i) a first operation signal sent from said operation terminal;

(ii) a second operation signal sent from the operation terminal; and (iii) a third operation signal sent from said operation terminal, said steps comprising:

a link display position information extracting step of analyzing the content data, and of extracting, from the content data, a plurality of display position information, wherein the plurality of display position information includes:

(i) first display position information of a first link display; and (ii) second display position information of a second link display, wherein the first display position information and the second display position information are included in the content data, the predetermined selection area being sized to accommodate:

(i) said first link display; and (ii) said second link display located in different positions within the predetermined selection area;

a selection area movement instructing step of receiving the first operation signal to instruct movement of a predetermined selection area displayed in the area where the content data is displayed, and of giving a first instruction corresponding to the first operation signal, wherein said predetermined selection area has a position;

a selection area displaying step of moving and displaying the predetermined selection area according to the first instruction given in the selection area movement instructing step;

a setting selection instruction step of receiving the second operation signal to instruct a setting of the position of the predetermined selection area, and of giving a second instruction corresponding to the second operation signal;

after the position of the predetermined selection area which accommodates the plurality of different links is set, a link selection instructing step of receiving the third operation signal to instruct a selection of one of said plurality of different predetermined links, said one of the plurality of different predetermined links being limited to any one of the plurality of different link displays displayed in the area where the content data is displayed and within the set predetermined selection area, and of giving a third instruction corresponding to the third operation signal;

a link selecting step of selecting the predetermined link instructed in the link selection instructing step when the link display corresponding to the predetermined link to be selected is displayed within the predetermined selection area; and sending step of sending, to the link destination of the selected predetermined link, a request for replying predetermined content data wherein the selection area displaying step has:

a circular selection area displaying step for moving and displaying the circular selection area according to the first instruction given by the selection area movement instructing step, a split selection area displaying step for splitting the area where the content data is displayed into a predetermined number of areas, for displaying the circular selection area in one of the split areas, and for moving the circular selection area on a split area basis according to the first instruction given by the selection area movement instructing step, and a display selecting step for receiving a fourth operation signal to instruct a selection of either the circular selection area displaying step or the split selection area displaying step, and for making the selection according to the fourth operation signal.

* * * * *